United States Patent [19]

Harper et al.

[11] Patent Number: 5,200,165

[45] Date of Patent: Apr. 6, 1993

[54] CONTROLLED PRECIPITATION OF AMORPHOUS, SILICA FROM GEOTHERMAL FLUID OR AQUEOUS MEDIA HAVING A SILICIC ACID CONCENTRATION

[75] Inventors: Ross T. Harper; James H. Johnston, both of Wellington; Nicholas Wiseman, Rotorua, all of New Zealand

[73] Assignees: Tasman Pulp & Paper Co. Limited, Auckland; Geochemistry Research Limited, Wellington, both of New Zealand

[21] Appl. No.: 495,976

[22] Filed: Mar. 20, 1990

[30] Foreign Application Priority Data

Mar. 23, 1989 [NZ] New Zealand .................... 228472
Jan. 19, 1990 [NZ] New Zealand .................... 232170

[51] Int. Cl.$^5$ .............................................. C01B 33/18
[52] U.S. Cl. ................................... 423/339; 423/335; 424/49
[58] Field of Search ................ 423/335, 339, 338; 501/154; 252/315.6; 562/233; 424/49

[56] References Cited

U.S. PATENT DOCUMENTS 4,389,385 6/1983 Ramsay .............................. 423/338

FOREIGN PATENT DOCUMENTS 0194116 9/1986 European Pat. Off. ............ 423/335
1186216 9/1986 Japan ................................... 423/335

OTHER PUBLICATIONS

Brine Clarification at Svartsengi, Iceland: Part I Effect of pH and Temperature on the Precipitation, by H. Thordarson and Th. Tomasson, The Science Institute, Reykjavik, Iceland and Icelandic Technological Institute, Reykjavik, Iceland, 1989.

Primary Examiner—Robert Kunemund
Assistant Examiner—Ken Horton
Attorney, Agent, or Firm—Nikaido, Marmelstein, Murray & Oram

[57] ABSTRACT

A method of obtaining precipitated amorphous silicas with substantially a tertiary aggregate structure (whether as an aqueous slurry, as cake, gel or otherwise) useful for coating and/or incorporation in paper and other substrates (e.g. rubber, plastics and the like) from a geothermal fluid (naturally or artificially generated—natural, including water infusion into geothermal systems) having sufficient silicic acid concentration, said method comprising:

A. ageing the fluid to effect polymerization, thus establishing a silica sol, ageing meaning a process in which the source fluid after being made supersaturated with respect to amorphous silica is held for a period of time, B. optionally (prior to, with and/or after step A—preferably prior to in order to reduce arsenic adsorption) reducing the temperature of the geothermal fluid and/or sol as the case may be, C. inducing precipitation of amorphous silica from the sol under conditions that will provide the tertiary aggregate structure, and D. thereafter harvesting the amorphous silica thus precipitated.

69 Claims, 15 Drawing Sheets

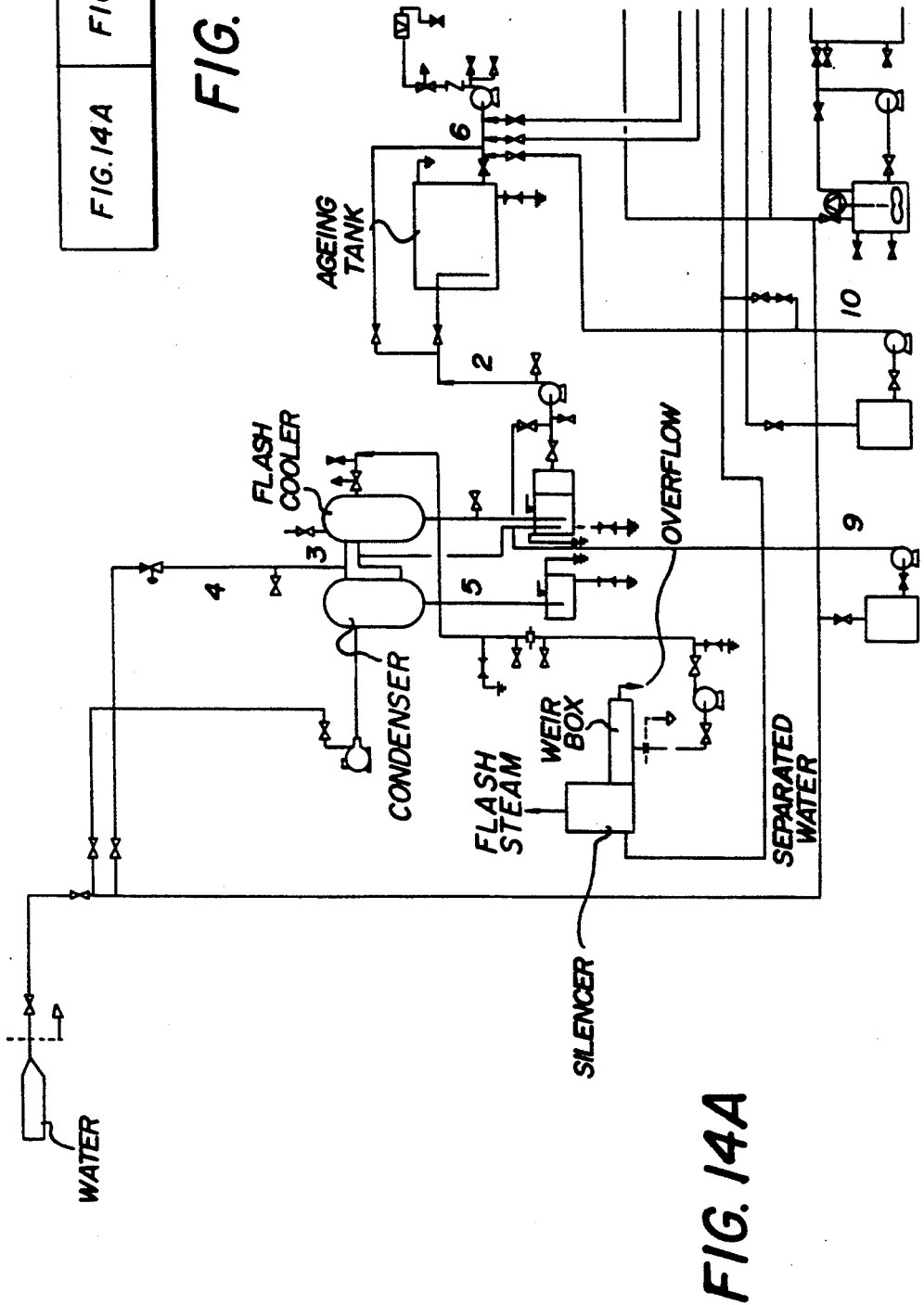

CONTROLLED PRECIPITATION OF AMORPHOUS, SILICA FROM GEOTHERMAL FLUID OR AQUEOUS MEDIA HAVING A SILICIC ACID CONCENTRATION

The process described here involves precipitation and separation of amorphous silicas from geothermal water and in some cases alternative aqueous sources and use of these products, in slurry or powder form, as general purpose fillers in various industries which produce; paper, rubber, paint, plastics, adhesives, cement agricultural chemicals and other materials requiring an additive or substrate with specific surface properties.

It is an object of the present invention to be able to derive from geothermal fluid (naturally or artificially generated—a natural geothermal fluid can include that fluid produced by water infusion into a geothermal system) and alternative aqueous sources with sufficient silicic acid, an amorphous silica having a substantially tertiary aggregate structure, of a kind different from that which occurs naturally, or at least to provide an amorphous silica product for inclusion in paper making or preparation, or for inclusion in other media.

BACKGROUND OF THE INVENTION

In this invention, the amorphous silicas are differentiated by structure into three classifications; namely, TYPES I, II and III.

Type I silica, defined here, is precipitated from geothermal water. This silica is commonly sourced for commercial use by acid treatment of sodium silicate solutions prepared for example, by the digestion of quartz sand with sodium hydroxide.

Type II and III silicas, defined here, may be precipitated from geothermal water or an alternate aqueous source. This alternative feedstock fluid should contain sufficient initial silicic acid and or silicate ion to allow controlled precipitation as described for geothermal water in this patent.

Type II precipitated silica is similar in structure to a class of commercial silicas normally prepared under anhydrous conditions, known as pyrogenic "arc" silicas. The "arc" process involves the oxidation of silicon monoxide [SiO] at very high temperatures under anhydrous conditions.

Geothermal water is normally characterized as being slightly acidic to neutral to slightly alkaline with significant concentrations of $SiO_2$, Na, K, Li, Ca, Mg, Rb, Cs, B, $SO_4$, Cl and dissolved gaseous species, e.g. $CO_2$, $H_2S$ and $NH_3$. Almost always, arsenic is present. A detailed chemical composition is shown in Table 8.

Arsenic contamination of precipitated silicas from a geothermal source may or may not be a problem, depending on the end usage of the precipitated silica. Thus while in some applications procedures must be adopted whereby the arsenic contamination of silica is reduced, for others it may not be necessary. For example, where amorphous silica is being precipitated for paper coating or impregnation usage, preferably the arsenic concentration is low, e.g. less than 2 mg $kg^{-1}$ in the paper sheet.

The present invention is directed to controlled processes which give rise to precipitated amorphous silicas having a structure which is different from that which occurs naturally upon cooling and deposition of silica from geothermal waters. Unlike such naturally occurring amorphous silicas, the precipitated amorphous silicas of the present invention have what is termed a "tertiary aggregate structure". A "tertiary aggregate structure" is a three dimensional structure consisting of aggregates of primary particles into secondary particles (substantially spherical) which themselves may be bridged by other accumulations of the primary particles (elongate accumulations) into the tertiary aggregate structure. Bridging silica is more frequently contained in Type I silica.

The precipitated silicas described in this invention are classified according to the structure they possess and are identified as:

TYPE I

Precipitated silica possessing primary, secondary and tertiary aggregate structure.

Primary silica particles are about 1.5 nm in size and secondary particulate silica, where discernible from overlap boundaries on electron micrographs, have random shapes approximately described in geometric terms as elongate ellipsoids.

Tertiary aggregate structure of this precipitated silica comprises the former particulates and is further characterized by the presence of secondary particulate "bridging silica" composed of primary silica particles. These serve to provide in fill silica which complete the tertiary aggregate structure. There is uniformity with respect to secondary particulate and bridging silica size. These structural characteristics are illustrated in FIGS. 1–3.

TYPE I precipitated silica satisfies the IUPAC classification for mesoporous material and is structurally consistent with G-type silica gels and pyrogenic "fume" silica produced from steam hydrolysis of silicon tetrachloride, e.g. Aerosils.

TYPE II

Precipitated silica possessing primary, secondary and tertiary aggregate structure.

Primary silica particles are about 1.5 nm in size and are aggregated to form secondary particles with definite spherical form. The diameter of these secondary particles is very variable.

Tertiary aggregate structure comprises the former particulates and is characterized by the random packing of secondary particles of discrete form and variable size, lacking the chain-like structure of TYPE I. The presence of secondary inter-particulate bridging silica is less evident than for TYPE I, (FIGS. 4 & 5).

TYPE II precipitated silica is morphologically consistent with pyrogenic silicas made under anhydrous conditions e.g. arc or plasma silicas.

TYPE III

Precipitated silica possessing primary, secondary and tertiary aggregate structure. Primary particle size is about 1.5 nm. Secondary particulate silica composed of the primary particles is variable is both size and shape.

Secondary particulate silica of TYPE I and TYPE II is present.

Tertiary aggregate structure combines characteristics of both TYPE I and TYPE II silicas. Tertiary aggregate structure is best characterized as diverse, lacking uniformity of secondary particle size and shape but having secondary particulate bridging silica present.

The TYPE III precipitated silica may contain secondary particulate silica and bridging material with equivalent circular or cross-sectional diameters significantly larger than TYPE I precipitated silica, (FIGS. 6 & 7).

The principal differences in structure for precipitated silicas according to the present invention involve the nature of the secondary particle or particulate system and the resultant tertiary aggregate structure. Electron microscopy has not resolved a primary particle size different for the precipitated silicas identified above.

Secondary silica particle morphology, and therefore tertiary aggregate structure, as developed from aqueous solution, can be influenced by the stage of polymerization at which a cationic agent is introduced into the process stream.

Without wishing to be tied to any of the theories herein given to explain the present invention, the invention will now be described. The theories however, are considered to be correct.

SUMMARY OF THE INVENTION

Accordingly, in one aspect the present invention may broadly be said to consist in a method of obtaining precipitated amorphous silica having substantially a tertiary aggregate structure (whether as an aqueous slurry, as a cake, powder, gel or otherwise) from a geothermal fluid (natural or induced) or for obtaining Types II and III silica, from a geothermal fluid (natural or induced) or an alternative aqueous source having a sufficient silicic acid concentration, (hereinafter all collectively referred to as "source fluid"), said method comprising the steps of:

A. ageing[1] the source fluid to effect polymerization, thus establishing a silica sol, ageing meaning a process in which the source fluid, after being made supersaturated with respect to amorphous silica, is held for a period of time,

[1] "Ageing" herein means a process in which the silica bearing fluid, having been made supersaturated with respect to amorphous silica, is held for a period of time. The aging time chosen prior to precipitation depends on the yield and nature of precipitated silica required for a certain application. Details of the effects of this process variable on precipitated silica extracted from geothermal water is provided elsewhere herein.

B. optionally (prior to, with and/or after step A) reducing the temperature of the source fluid and/or sol as the case may be, C. inducing precipitation of amorphous silica from the sol under conditions that will substantially provide the tertiary aggregate structure, and D. thereafter harvesting the amorphous silica thus precipitated.

MORE DETAILED DESCRIPTION OF THE INVENTION

Preferably the source fluid is a geothermal fluid.

Preferably a sufficient silica concentration is from 400 to 1400 mg kg$^{-1}$ expressed as silica. This preferred concentration promotes spontaneous nucleation and covers the concentration normally obtained from geothermal discharges. However higher silica concentrations do sometimes occur and processing of these fluids is similar to that described here, recognizing however that dilution and/or pH adjustment may be necessary to obtain control over the onset and rate of polymerization. A process stream with lower initial silicic acid concentrations may require lower process temperatures to promote spontaneous nucleation.

Preferably the ageing of the source fluid is for such time as is necessary for the polymerization within the fluid to provide primary particles.

Preferably said source fluid has a silicic acid concentration outside of the range of from 400 to 1400 mg kg$^{-1}$, expressed as silica, and dilution, pH adjustment and/or temperature adjustment is used to control the onset and rate of polymerization in the ageing step A. Where arsenic reduction is required, preferably optional step B is performed prior to any substantial performance of step A, i.e. the longer the fluid is left at higher temperature (refer FIG. 11), the more adsorption of arsenic occurs upon precipitation of the silica sol.

Preferably said fluid includes arsenic values and step B is performed prior to any substantial performance of step A, thereby minimizing adsorption of arsenic on the precipitated silica. In relation to optional step B, arsenic adsorption onto the colloidal silica surface is, in part, a kinetic temperature dependent relationship. Lowering the fluid temperature as soon as possible is a factor in reducing arsenic adsorption, and thus is reducing ultimate arsenic concentrations in the resultant derived silica having substantially a tertiary aggregate structure.

Preferably step A is performed at a pH from 7 to 9.5, however where silica concentrations are sufficiently high to effect rapid polymerization, lower pH's can apply i.e. 5 to 7.

Preferably said source fluid, just prior to the ageing step A, is at or near 100° C. and is rapidly cooled to about 30° C. (except for Type II silica).

Preferably step C involves the addition to the silica sol of coagulants which will induce precipitation of amorphous silica but without introducing excessive amounts of undesired contaminants to be co-precipitated. Most preferably the sol, when precipitation is induced, is slightly alkaline, (e.g. preferably a pH of from 7 to 9.5) whereupon the addition of a cation or cationic polymer is sufficient for the purposes of inducing precipitation. A preferred cation is a $Ca^{2+}$, however, $Al^{3+}$ or $Fe^{3+}$ can be used instead of or in conjunction with this preferred cation, provided that the use of these latter cations does not degrade the product. Another option available, in inducing the precipitation from the substantially stable silica sol, in conjunction with the use of the coagulants above or independent of these, is the use of an organic flocculent. It is most appropriate to use a cationic flocculent at higher pH where the silica surface is substantially negatively charged and a non-ionic flocculent at or below neutral conditions whereupon hydrogen bonding can occur.

Preferably induction of precipitation in step C is at a pH of from 7 to 9.5 and involves the addition of a cation and/or a cationic polymer sufficient for the purposes of inducing precipitation while the sol is at a pH of from 7 to 9.5.

Preferably the induction of precipitation in step C is with a source of $Ca^{2+}$.

Preferably the induction of precipitation in step C involves (i) the use of a cationic flocculent if the sol pH is sufficiently high for that to be effective in inducing precipitation, or (ii) a non-ionic flocculent is the sol pH is at or below neutral pH conditions.

Preferably step D is performed using any known separation or purification process and it may involve washing or other cleaning steps for the particles derived or may simply involve the isolation of an aqueous slurry of the amorphous silica.

Preferably the amorphous silica product is of Type II or Type III, and preferably the source fluid has been artificially generated.

In a further aspect, the invention consists of, in a paper making process or system:

(I) a process or system or providing, as a slurry, precipitated amorphous silica having substantially a tertiary aggregate structure from a geothermal fluid (natural or induced), or, for Types II and III silica, a geothermal fluid or an alternative aqueous source (hereinafter "source fluid") having a sufficient silicic acid concentration, the method comprising the steps of:

(a) ageing the fluid to provide a silica sol, (b) optionally (prior to, with and/or after step (a)) reducing the temperature of the geothermal fluid and/or sol as the case may be, (c) inducing precipitation of amorphous silica from the sol under conditions that will provide substantially the tertiary aggregate structure, and (d) creating the aqueous slurry of the amorphous silica, and (II) introducing the amorphous silica slurry into the paper making the system for the purposes of filling and/or coating of the paper with the silica contained therein.

Preferably said geothermal fluid is natural.

Preferably said silica resulting from (I) is not a Type II or III silica.

Preferably said silica resulting from (I) is not a Type II or III silica.

Preferably energy is derived from the geothermal fluid (e.g. for use in the general paper making process), if the geothermal resource is proximate to the papermaking plant.

Preferably energy is primarily derived from the geothermal fluid early or substantially before the performance of step (a).

Preferably the method of obtaining precipitated amorphous silica in the paper making process or method is in accordance with the present invention as previously defined.

In yet a further aspect, the present invention consists in the precipitated amorphous silica which has been produced by a process in accordance with the present invention.

In still a further aspect, the invention consists of paper containing substantially a tertiary aggregated amorphous silica derived from a geothermal fluid (natural or induced), or containing Types II and III silica from a geothermal fluid (natural or induced), or an alternative aqueous source having a sufficient silicic acid concentration, by a process comprising the steps of:

(a) ageing a geothermal fluid having a sufficient silicic acid content to provide a silica sol, (b) optionally (prior to, with and/or after step (a)) reducing the temperature of the geothermal fluid and/or sol as the case may be, (c) inducing precipitation of amorphous silica from the sol under conditions that will provide the precipitate with a substantially tertiary aggregate structure, (d) providing or creating an aqueous slurry of the amorphous silica, and (e) introducing the amorphous silica slurry into the paper making system for the purposes of filling and/or coating of the paper being made with the silica contained therein to provide the paper product.

Preferably said silica is Type I silica, Type II silica, Type III silica, or a blend of more than one of Type I, Type II and Type III silicas.

In another aspect, the invention consists of a method of obtaining precipitated amorphous silica having a Type I tertiary aggregate structure with a B.E.T. surface area in the range of 60 $m^2g^{-1}$ and greater (whether as an aqueous slurry, as a cake, powder, gel or otherwise) from a geothermal fluid (naturally or created by water infusion into a geothermal system) having a sufficient silicic acid concentration of from 400 to 1400 mg $kg^{-1}$ (expressed as silica), said method comprising the steps of:

(i) rapidly cooling the fluid, starting from the time at which it reaches supersaturation with respect to amorphous silica, to a lower temperature which is 30° C. or above, (ii) ageing the fluid for a time, without added coagulant present, at a pH of from 5 to 9.5 to effect polymerization thus establishing a silica sol that will lead to the Type I structure, (iii) inducing precipitation of amorphous silica from the silica sol of induction by introducing an inducing agent, selected from the group consisting of cationic agents, cationic coagulants, cationic flocculents, nonionic and anionic flocculents, to thereby provide silica of the Type I tertiary aggregate structure and (iv) thereafter providing the silica product in the form required.

In yet another aspect, the invention consists of a method of obtaining precipitated amorphous silica having a Type II tertiary aggregate structure (whether as an aqueous slurry, as a cake, powder, gel or otherwise) from a geothermal fluid (naturally or created by water infusion into a geothermal system) or an alternative aqueous source having a sufficient silicic acid concentration, of from 400 to 1400 mg $kg^{-1}$ (expressed as silica), said method comprising the steps of:

(i) optionally cooling the fluid starting from the time at which it reaches supersaturation with respect to amorphous silica, to a temperature at which rapid precipitation can occur, (ii) ageing the fluid for a time, with added coagulant present at a pH of from 4 to 9.5, to effect rapid precipitation of the Type II structure, and (iii) thereafter providing the precipitated silica product in the form required.

In yet another aspect, the invention consists in a method of obtaining precipitated amorphous silica having Type III tertiary aggregate structure (whether as an aqueous slurry, as a cake, powder, gel or otherwise) from a geothermal fluid (naturally or created by water infusion into a geothermal system), or an alternative aqueous source having a sufficient silicic acid concentration of from 400 to 1400 mg $kg^{-1}$ (expressed as silica), said method comprising the steps of:

(i) optionally cooling the fluid, starting from the time at which it reaches supersaturation with respect to amorphous silica, to a temperature at which precipitation can occur, (ii) ageing the fluid for a time, with added coagulant present at a pH of from 5 to 9.5, to effect progressive precipitation of the Type III structure, (iii) completing precipitation by the addition of further coagulant and/or flocculent (iv) thereafter providing the precipitated silica product in the form required.

Another aspect of the invention is the Type I amorphous silica derived from a geothermal fluid by a process comprising:

(i) rapidly cooling the fluid, starting from the time at which it reaches supersaturation with respect to amorphous silica, to a lower temperature which is 30° C. or above, (ii) ageing the fluid for time, without added coagulant, at a pH of from 5 to 9.5 to effect polymerization, thus establishing a silica sol that will lead to the Type I structure, (iii) inducing precipitation of amorphous silica from the silica sol by induction, by providing an inducing agent selected from the group consisting of cationic agents, cationic coagulants, cationic flocculants, nonionic and anionic flocculants, to thereby provide the type I tertiary aggregate, and (iv) thereafter providing the silica product in the form required.

Still another aspect of the invention is the precipitated amorphous silica derived from a geothermal fluid having a sufficient silicic acid (hereafter "source fluid") content by a method comprising the steps of:

A. ageing the fluid to effect the polymerization, thus establishing a silica sol, ageing meaning a process in which the source fluid, having been made supersaturated with respect to amorphous silica, is held for a period of time, B. optionally (prior to, with and/or after step A) reducing the temperature of the source fluid and/or sol as the case may be, C. inducing precipitation of amorphous silica from the sol under conditions that will provide the tertiary aggregate structure, and D. thereafter harvesting the amorphous silica thus precipitated.

In still a further aspect, the invention consists of a product comprising a medium in combination with a silica derived from a process of obtaining precipitated amorphous silica having substantially a tertiary aggregate structure (whether as an aqueous slurry, as a cake, powder, gel or otherwise) from a geothermal fluid (natural or induced), or of Types II and III silica derived from a geothermal fluid (natural or induced) or an alternative aqueous source having a sufficient silicic acid concentration (hereinafter all collectively "source fluid"), said method comprising the steps of:

A. ageing the fluid to effect polymerization, thus establishing a silica sol, ageing meaning a process in which the source fluid, after being made supersaturated with respect to amorphous silica, is held for a period of time, B. optionally (prior to, with and/or after step A) reducing the temperature of the source fluid and/or sol as the case may be, C. inducing precipitation of amorphous silica from the sol under conditions that will substantially provide the tertiary aggregate structure, and D. thereafter harvesting the amorphous silica thus precipitated;

said silica being incorporated in, onto and/or about said media.

In yet a further aspect, the present invention consists of paper filled with and/or coated with precipitated amorphous silica derived from a process of the present invention.

In another aspect, the present invention consists of a paper which includes thereon and/or therein precipitated amorphous silica derived from a process of the present invention.

In another aspect, the invention consists of a paper which includes thereon and/or therein precipitated amorphous silica having substantially a tertiary aggregate structure derived from geothermal fluids.

Preferably said precipitated amorphous silica has been obtained by a process in accordance with the present invention.

In yet a further aspect, the present invention consists of precipitated amorphous silica having substantially a tertiary aggregate structure derived from geothermal fluids. Preferably said silica has been derived from a geothermal fluid.

Specific details of the process will now be disclosed and preferred forms of the present invention described. Precipitated silicas so produced have been successfully used, tested and/or characterized as suitable for several applications e.g. as filler, extender, pacifier, thixotropic agent, and absorbent.

Figure 1:
FIG. 1 is a photomicrograph showing an enlarged view of Type I silica.

In figure the precipitated silica has a tertiary aggregate structure arising from secondary particles of silica being bound together by substantial amounts of bridging silica. Primary particles can be seen as small rod like entities ~1.5 nm in size. The precipitated silica shown in FIG. 2 and is consistent with commercial precipitated and pyrogenic silicas made in the presence of hydrogen containing compounds e.g. Aerosils, made by steam hydrolysis of $SiCl_4$. Each precipitate was prepared by using 200 mg $kg^{-1}$ $Ca^{2+}$ as coagulant, with small differences in initial silicic acid concentration, pH and temperature. The secondary particles shown in FIGS. 4 and 5 have spherical geometry and are of variable size, consistent with pyrogenic silicas normally produced under anhydrous conditions. The photomicrographs of FIGS. 6 and 7 reveal a combination of the structural characteristics of Types I and II silicas. The Type I component typically contains large secondary particles and bridging silica together with a smaller size fraction normally contained in pure Type I silica.

PRODUCT APPLICATIONS

The precipitated amorphous silicas identified herein can be obtained in high purity. Product with greater than 97 wt % $SiO_2$, on an anhydrous basis, can be achieved with relative ease. This can be further upgraded by using simple washing techniques, if necessary, as the remainder comprises surface adsorbed calcium, involved in the inter-particle bridging process at this pH, which can be readily substantially removed.

The optical properties, when measured on a pure silica product, can have the following L*, a* and b* values (CIE scale, illuminant D65 and 10° viewing angle from normal observer).

L*;—97.8
a*;—0.0
b*;—1.3

Type I silica has thixotropic qualities which makes it suitable for use in applications where thickening or reinforcement by an additive is required.

The relatively high surface area of Types I and III silicas described in this patent, their complex structural characteristics, and their high pore volumes make these silicas suitable for many applications where absorptive capacity of additives is important.

For example, durable rubber products are made with the use of filler which has an open reticulated structure. Such fillers have surface area of 60 $m^2 g^{-1}$ and oil absorption capacities of $\sim 180$ $cm^3$ 100 $g^{-1}$. These characteristics are very similar to that obtained for several Type I silicas produced by processes described in this patent, some of which have been characterized in section 4 infra.

Type II silica is normally made synthetically under anhydrous conditions and using very high energy processes. It does not have the same thixotropic qualities as Type I silica. It is easily dispersed in most solid and liquid systems. Similar product is extensively used as an extender in systems employing expensive high grade filler or coatings e.g. $TiO_2$.

APPLICATION TO PAPER

A precipitated silica slurry can be used directly in the paper-making process, where it is incorporated into the paper sheet to improve print and optical qualities. Alternatively the solid product may be re-slurried and used similarly.

Precipitated silicas of all classes described herein have been tested in paper handsheets. Addition has included both slurry and powder forms. The print quality of handsheets has been evaluated for all silicas produced as described in the process and laboratory examples hereof as well as commercially accepted high grade fillers.

Handsheets were manufactured using a typical newsprint pulp furnished to strict grammage tolerance of 48±0.5 g $m^{-2}$ (air dry weight—AD). These were then soft calendared to a caliper of 75±3 $\mu$m to obtain a representative for comparison with industry standard newsprint.

Several Type I silicas of this invention improved both the unprinted and printed optical properties of the paper above that achieved with established filler materials. Type I silica products have relatively high pore volumes and surface areas of 60–>300 $m^2 g^{-1}$ (dried material). The tertiary network structure is present in both the slurry and powdered forms. The measured oil absorption capacities of the dried powder are up to 280 $cm^3$ 100 $g^{-1}$. These qualities are very important to the effective function of the precipitated silica in paper.

Types II and III silicas improved print quality to a lesser extent. This inferior performance is considered to arise from the less highly developed pore structure of these precipitated silicas which affects oil absorption capacities of these products in the sheet.

Print-through decreased by as much as 0.03 units at an ash level (filler content) in the range 1–6 wt %. Opacity was increased by as much as 1–3 percentage points at $\sim 2$ and 4 wt % addition respectively. Both wire and felt sides of the paper were similarly improved at two inking levels tested.

BACKGROUND

Moderate concentrations of silicic acid are present in geothermal fluid as a result of the dissolution of silica containing minerals from the rock material in contact with the geothermally heated water.

This fluid may be naturally discharged from surface thermal manifestations or may be produced artificially, from wells drilled to increase mass withdrawal, for whatever purpose.

If silicic acid concentrations at the surface are sufficiently high, polymerization, with spontaneous homogeneous nucleation, results in critical size nuclei which rapidly grow to form primary particles.

Spontaneous nucleation of the parent monomeric silicic acid species and subsequent growth by polymerization, forms a polymeric primary particle which attains a physical dimension of $\sim 1.5$ nm.

Under slightly acidic to neutral conditions, this is best represented by the condensation reaction:

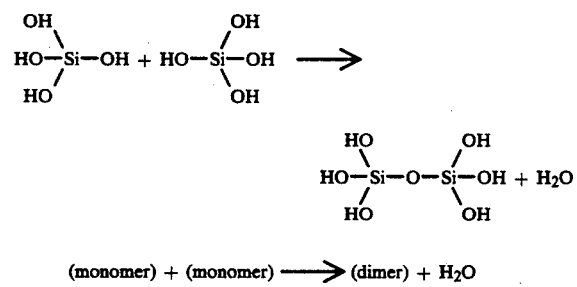

(monomer) + (monomer) $\longrightarrow$ (dimer) + $H_2O$

Under more alkaline conditions, e.g. pH>7, dissociation of silicic acid to silicate ion becomes significant, according to:

Polymerization under these conditions is considered to favor the following reaction:

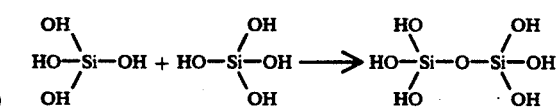

Primary particles resulting from this type of reaction can be observed under high power transmission electron microscopy, as shown in FIG. 1.

The primary particles constitute the colloidal silica sol initially formed. However, aggregation of these primary particles to form in part, secondary, approximately spherical particles occurs throughout a period of aging and/or when electrostatic dispersive forces are reduced through introduction of a cationic agent.

Figure 4:
FIGS. 4 and 5 are photomicrographs of Type II precipitated silica possessing tertiary aggregate structure with secondary particles more clearly evident and bridging silica present to a lesser extent compared to Type I, above.
Figure 5:

The sol so formed after this treatment for types I and III silicas consists of secondary particles together with primary particles in various stages of aggregation (FIGS. 1-3 and 6-7). Aggregation of, and in fill between, secondary spheroidal particles and accretion of the same is consistent with the low solubility of this region with respect to amorphous silica, due to the negative radius of curvature occurring when any two spheroidal particles approach one another. However, for type II silica, the development of secondary particles is essentially complete (FIGS. 4-5).

These stages of aggregation are consistent with the presence of secondary particulate silica of variable shape and form in the final, substantially tertiary aggregate structure produced from the destabilization and precipitation of the silica sols.

At slightly acidic to neutral pH, the silica surface is only partly ionized and as such may continue to hydrogen bond and therefore aggregate, to form larger secondary particles. At higher pH, e.g. 8 to 9, the primary silica particles and small aggregates of the primaries are more negatively charged. Further aggregation to develop full secondary and tertiary particulate structure requires reduction of these electrostatic repulsive forces by addition of a cationic agent.

Silicic acid concentrations, required to promote spontaneous nucleation, typically range from 400-1400 mg kg$^{-1}$ although higher concentrations do arise and can be treated similarly for the precipitation process. If control over the onset and rate of polymerization is desirable, then dilution or pH adjustment may be necessary. Once a sol is established, it may be stable or unstable, under natural conditions. This is mostly dependent on temperature, initial silicic acid concentration, existing electrolyte concentrations, average particle size and phH.

Figure 8:
FIG. 8 is a photomicrograph of a natural silica deposit.

Under most conditions the relatively dilute nature and neutral to alkaline pH of the geothermal waters, renders the sol stable. However, if precipitation/deposition does occur naturally, it is usually uncontrolled and, depending upon the local environmental conditions, the resulting amorphous silica exhibits a wide range of particle sizes and shapes, (FIG. 8). In addition, geothermal waters contain a wide range of other constituents, present in either cation or anion form. For example, significant concentrations of Na, K, Li, Ca, Mg, Rb, Cs, B, SO$_4$, Cl, As, and Hg can be present. Some constituents such as arsenic, can readily adsorb on to the colloidal silica surface at particular pH and precipitation conditions, such as those that do exist naturally. The naturally precipitated silica therefore, usually contains significant quantities of arsenic, which, together with its wide range in particle size and shape, often renders this naturally precipitated silica unsuitable for such commercial applications considered here.

However, under controlled conditions, precipitation can be induced to yield a product which is suitable for commercial applications such as that described here in detail, for papermaking.

In this controlled precipitation, primary silica particles are always the fundamental silica unit from which secondary particles and the tertiary aggregates develop.

The secondary and tertiary particle size, surface silanol group density, chemical purity and optical quality of the silica product can be controlled. Such controlling factors include aging time, stage at which coagulant is added, method of cooling the geothermal water, the cooling profile, precipitation temperature, pH and nature and concentration of the coagulant and/or flocculent used.

Manipulation of these process parameters provides the suite of precipitated silicas classified as Types I, II and II.

FIGS. 1 to 7 illustrate some of the more structurally different products and detailed procedures of precipitation are provided in laboratory and process example attached.

TYPE I precipitated silica results from coagulation of silica from geothermal water in which dissolved silica species have been allowed to polymerize in the absence, or presence of an agent at a concentration lower than the "critical coagulant concentration"[2] which reduces the electrostatic repulsive forces, e.g. primary coagulant catio, Ca$^{2+}$. Polymerization in this case is allowed to proceed until the concentration of molybdate reactive silica is substantially reduced. The time used to effect this extent of polymerization is dependent on pH, temperature, initial silicic acid concentration and yield required.

[2]"critical coagulant concentration" used i this context refers to that coagulant concentration where rapid coagulating results in precipitation.

TYPE II precipitated silica results from coagulation of silica from geothermal water to which an agent capable of reducing the electrostatic forces of the negatively charged primary silica particles once formed, has been added prior to the occurrence of spontaneous nucleation. Spontaneous nucleation results in the formation of critical size silica nuclei and primary particles. The point of addition of coagulant depends on the degree of supersaturation of the process stream with respect to amorphous silica solubility as spontaneous nucleation can not occur until this is exceeded. The concentration of coagulant should be such as to exceed the critical coagulant concentration and to effect progressive coagulation and precipitation.

TYPE III precipitated silica results from coagulation of silica from geothermal water to which an agent capable of reducing the electrostatic repulsive forces of the negatively charged silica particles once formed has been added during spontaneous nucleation and polymerization. The characteristics of the precipitated silica depend on the exact timing of coagulant addition relative to the rate of polymerization. For example, the existence of a significant induction period[3] at low initial silicic acid concentrations enables addition of coagulant just prior to and during subsequent polymerization. This results in a greater presence of TYPE ii silica in the product. If silicic acid concentrations are sufficiently high such that a very short induction period exists, a greater fraction of TYPE I silica results.

[3]the induction period in this context refers to the time required for critical size nuclei to form and grow to the point where molybdate reactive silica concentration is measurably reduced.

Figure 9:
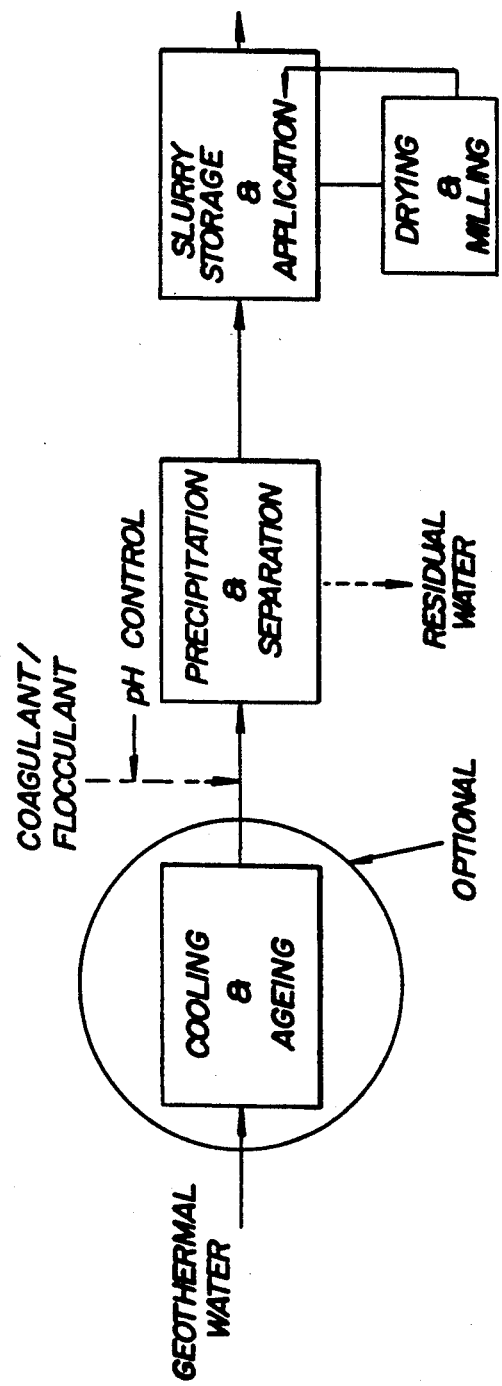
FIG. 9 is is a block flow diagram of the process of this invention.

The overall preferred process involves cooling, aging (optional), induced precipitation and product separating stages. If a dried product is required, then a further drying and milling (grinding) stage is added, (FIG. 9).

PROCESS VARIABLES

Cooling

Cooling is optional if source water is at or near 100° C. The use of cooling in this case depends on the yield, arsenic concentration and type of precipitated silica to be produced. If the source water is at saturation pressure and temperature above atmospheric then cooling is used.

Typically, a flash cooler, heat exchanger, cooling tower or ponding may be used. The cooling step is a method used to decrease induction time by increasing initial silicic acid concentrations relative to amorphous silica solubility and reduces the contamination of the precipitated silica, with arsenic, to acceptable levels.

If this cooling step is not included in the manufacture of TYPE I precipitated silica, prior to aging, then geothermal water initially at 100° C., may yield a silica product with arsenic concentrations as high as 500–60 mg kg$^{-1}$. If this water is rapidly cooled to about 30° C., then the arsenic concentration may be reduced to less than about 20 mg kg$^{-1}$.

Arsenic Adsorption

The most important factors affecting arsenic speciation in geothermal solution with respect to this process are the initial activity of the total sulphur species and its effect on oxidation potential and also pH, temperature and flash conditions.

The hydrogen arsenite ($H_2AsO_3^-$) and thioarsenite ion ($As_2S_4^{2-}$) are considered to be the predominant arsenic species in geothermal water at atmospheric conditions and unmodified pH.

Experimental evidence indicates that when arsenic adsorption occurs onto the silica surface, then As(III) species are less readily adsorbed compared to As(V).

Figure 10:
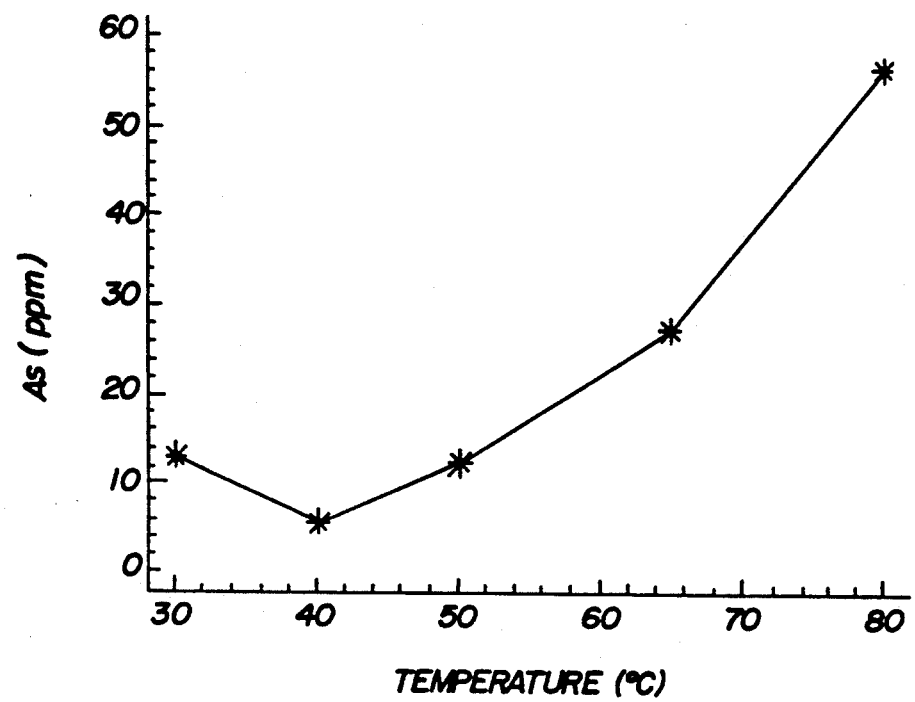
FIG. 10 is a graph of the relationship between arsenic absorption on precipitated silica and the aging temperature at a constant aging time.
Figure 11:
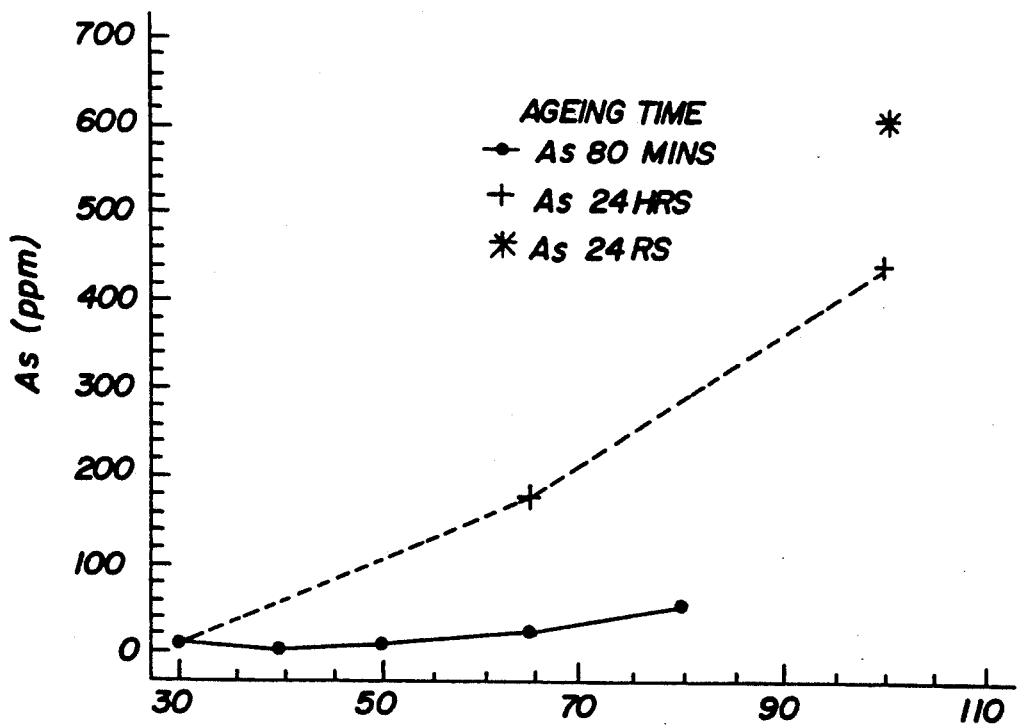
FIG. 11 is a graph of the relationship between arsenic absorption on precipitated silica and the aging temperature at different aging times.

Also, arsenic adsorption at the silica surface occurs largely during the induced coagulation steps; the extent of oxidation of As(III) to As(V) species e.g. from $H_2AsO_3^-$ to $HAsO_4^{2-}$ (hydrogen arsenate ion). Adsorption of arsenic species through this oxidation step is kinetically controlled and therefore temperature dependent. This is illustrated in FIGS. 10 & aa. A significant difference in the concentration of arsenic adsorbed onto the silica surface occurs for precipitates which result from sols grown at:

i) high temperature for a short time or low temperature for long times, and ii) high temperature for a long time.

Figure 12:
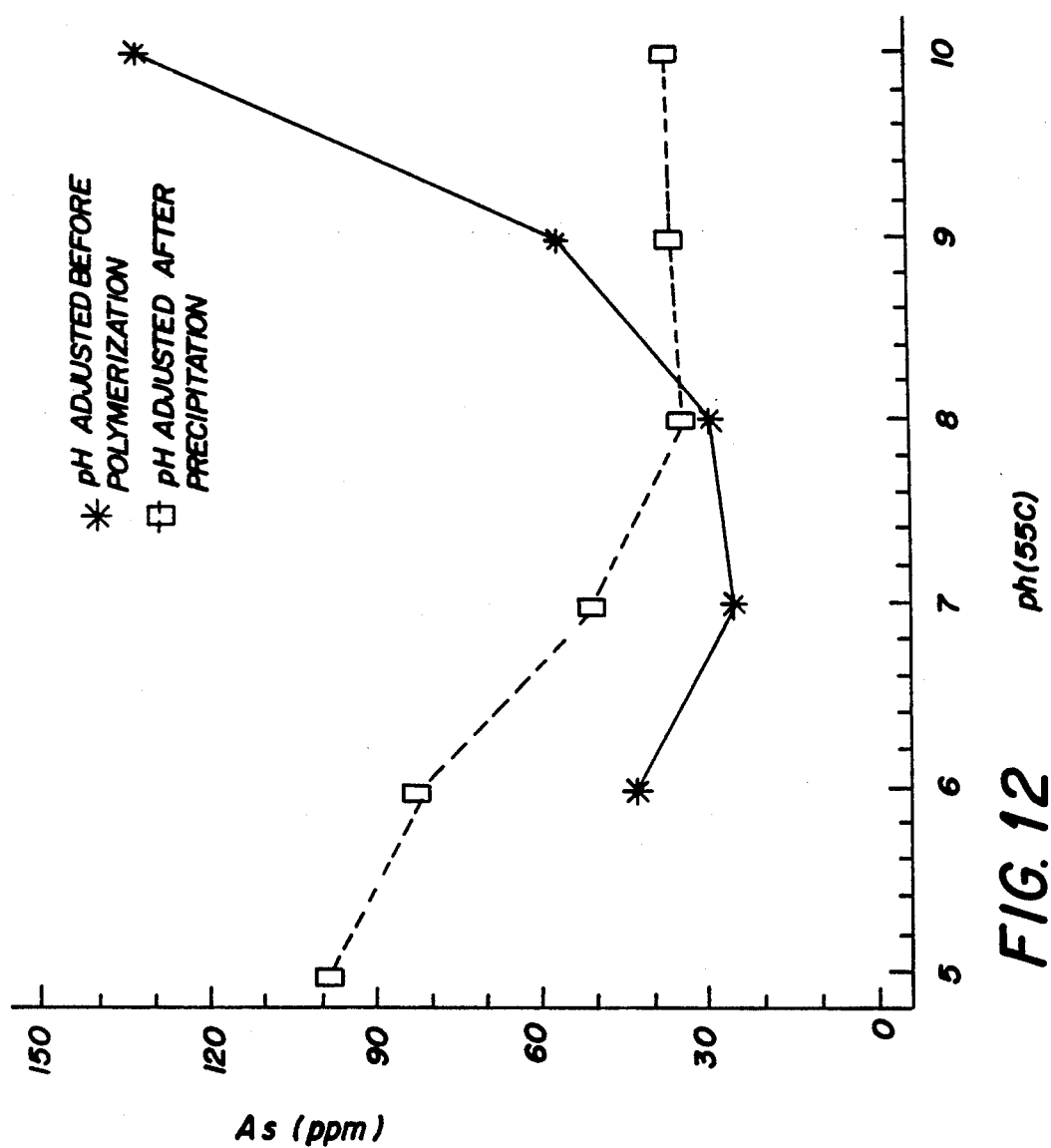
FIG. 12 is a graph of the relationship between arsenic absorption on precipitated silica and the pH of the system during aging.

To a lesser extent, pH of solution during polymerization, or of the mother liquor after precipitation, has an influence over arsenic adsorption. FIG. 12 shows arsenic concentrations for precipitates produced from the same source fluid with pH adjusted before and after precipitation. Most geothermal discharges have pH in the range 5–10 and more commonly 6–9. The allowable arsenic concentration of the final product is application dependent and may require pH control to minimize arsenic adsorption. However precipitated silicas for use as paper filler are best extracted at solution pH 7–9.

Figure 13:
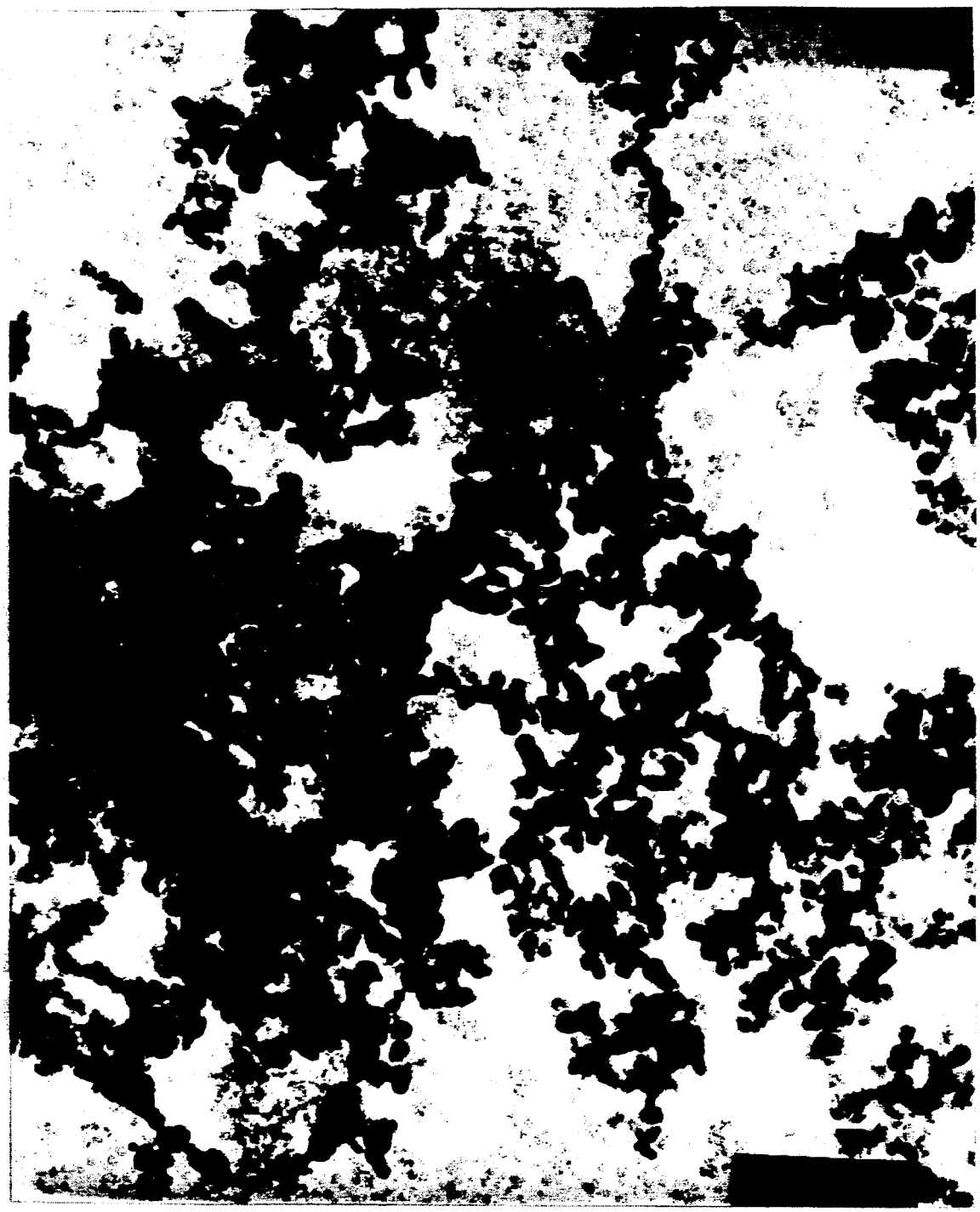
FIG. 13 is a phiotomicrograph of an arsenic sulphide sol.

An amorphous arsenic sulphide ($As_2S_3$) sol is established if pH is adjusted much below 7 depending upon the concentration of $H_2S$ present upon this pH adjustment. This situation may arise by the hydrolysis of $Al^{3+}$, when this is used to effect coagulation. The arsenic sulphide sol may on occasions be co-precipitated (refer FIG. 13) to an extent which compromises the otherwise high optical specifications of the precipitates silica.

Water pH

Water pH may be adjusted to 7–9.5 if it is more acidic than this, prior to, with and/or after cooling and aging, in order to achieve sol destabilization at reduced coagulant concentrations. The colloidal silica sol is least stable at about pH 9. There is no need to adjust pH should this naturally be slightly above pH 9, if rapid polymerization (short induction period) is acceptable. The need for pH adjustment will generally vary, depending upon the particular source of geothermal water and whether or not induction time needs adjustment.

Aging

An aging state is introduced to promote polymerization if TYPE I silica is to be produced. Limited aging occurs in the situation where TYPE II & III precipitated silicas are produced, however aging is in the presence of coagulant in excess of the critical coagulant concentration and is form substantially shorter periods than that employed for the production of TYPE I precipitated silica. Aging, where it is used to increase the extend of polymerization, increases yield.

Precipitation

Precipitation is induced by the addition of coagulant or coagulant/flocculent combination. The concentration of coagulant attained is sufficient to exceed the critical coagulant concentration for a specified set of conditions and effect rapid coagulation and precipitation of silica.

Cations, polycations, or positively charged colloidal particles can be used to achieve coagulation of the primary and secondary silica particulates. Not only do these function by reducing the electrostatic repulsive interaction of negatively charge, silica particle surfaces but they can also interact through proton exchange of the silanol surface.

For example, $Ca^{2+}$ ion may be obtained from a soluble calcium contain salt and serves not only to reduce the negative surface charge but can exchange for a single silanol proton thus imparting a net positive charge which provides an active site for inter-particle bridging. These simple cations are therefore surface adsorbed and remain part of the precipitate albeit in small concentration relative to the bulk solution and may be substantially removed by mild acid washing.

If calcium ions are used as the sole coagulant, then the concentration of the free calcium ion in solution after coagulation, should remain preferably between 50 and 1000 mg kg$^{-1}$. The concentration used depends on the type of precipitated silica to be produced and secondary particulate size required.

Separation

Precipitated silica can then be removed either by filtration, as slurry from a thickener or by a dissolved air flotation system. Alternatively it may be dried, which generally requires further milling or grinding, to yield a solid product with an appropriate tertiary aggregate particle size range required for particular commercial usage.

If the geothermal resource is located close to a paper mill, then the slurry product can be piped to the mill for incorporation directly into the papermaking process.

The important physical and chemical parameters which characterize the suite of precipitated silica are provided in the following process and laboratory examples.

PRECIPITATED SILICA PROCESS EXAMPLES

1.0 Process Description

1.1 Introduction

Figure 14B:
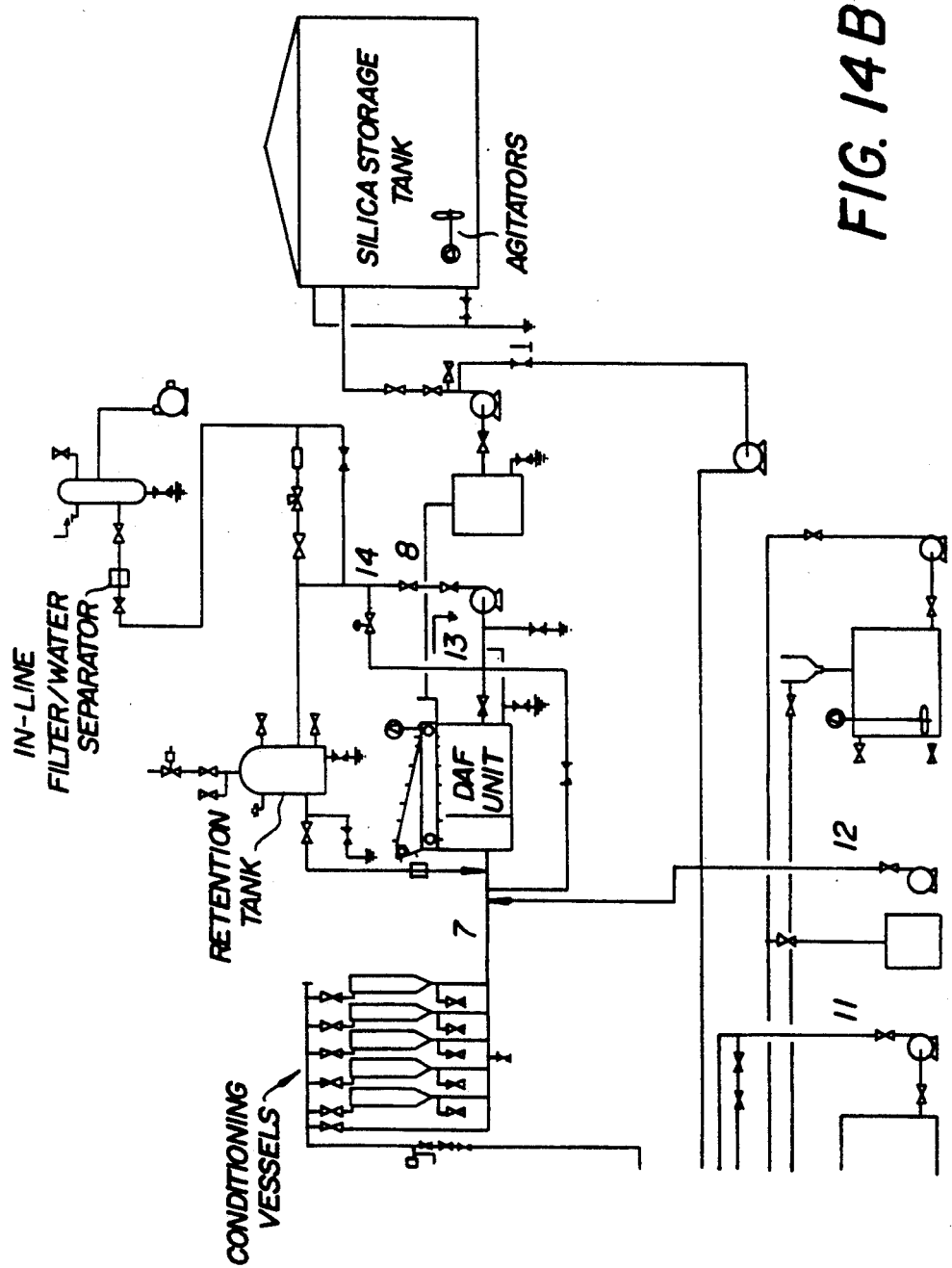
FIGS. 14(a) and (b) are shematic diagrams of the process of this invention.
Figure 15:
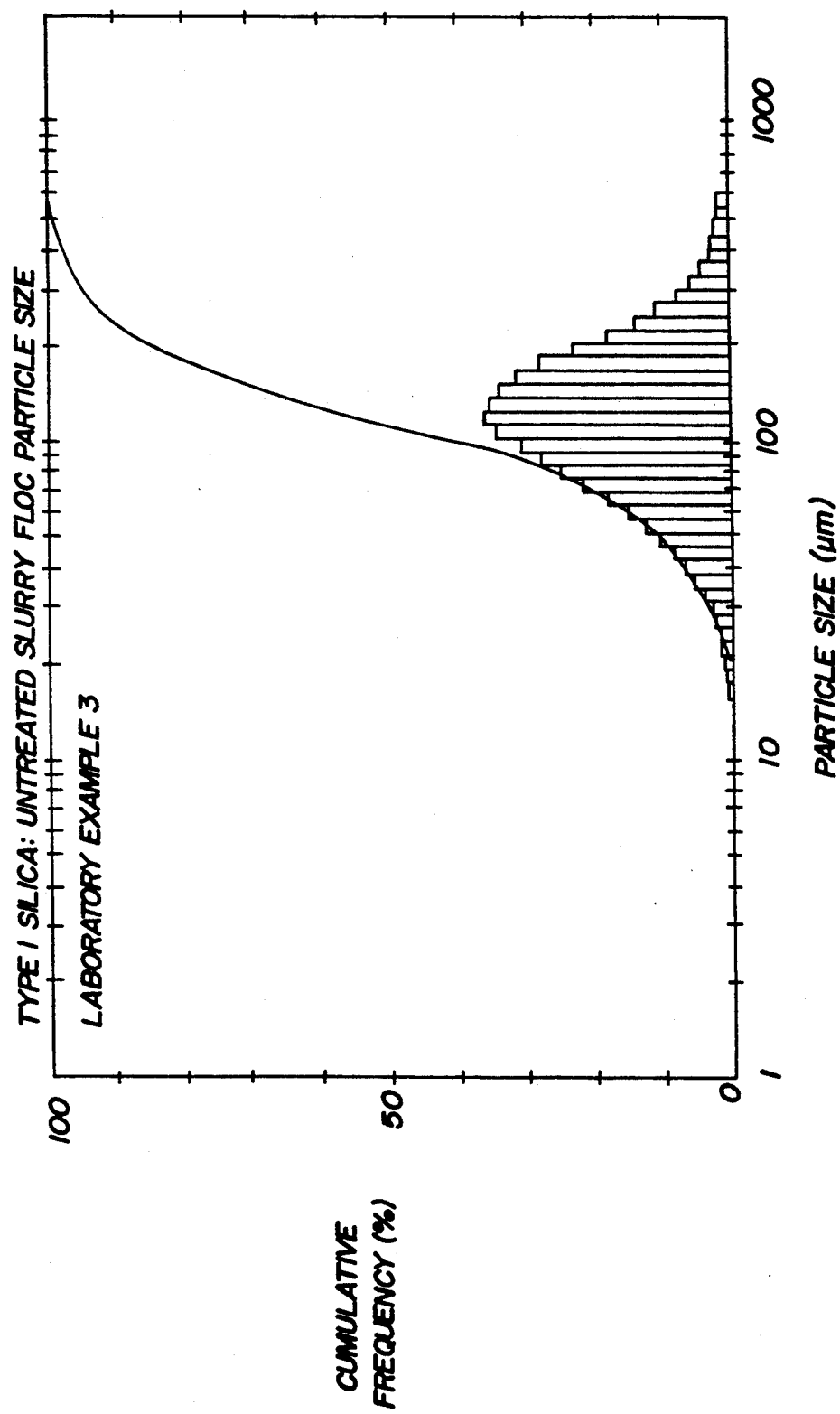
FIG. 15 is a graph showing the untreated slurry floc particle size distribution.

The following account describes the essential engineering features of a plant to process separated water from production wells in a geothermal field with the objective to precipitate amorphous silica. As discussed elsewhere, this process could also apply to an alternative fluid source sufficiently rich in dissolved silica to form primary silica particles. FIG. 14 provides a schematic plan of the process, with a mass balance for process example 1. No reference to control equipment is made.

In this case, the plant is described for a feedstock flow rate of 10 kg s$^{-1}$ at 100° or slightly below. However the plant can be scaled up to meet larger separated water flows, for commercial purposes.

Precipitated silicas obtained from this process have been characterized and are described in some detail as part of the laboratory examples in section 4 hereof.

1.2 Concentration and Cooling

Feedwater can be taken from a variety of sources. The main requirement is that fluid silica concentrations are sufficiently high to effect spontaneous nucleation upon cooling. However for the purpose of describing the operation of a process plant, and to illustrate the nature of the precipitated silicas produced under different conditions, the following water sources are considered:

i) water obtained or separated at atmospheric pressure ii) water separated at higher than atmospheric pressure water separated at atmospheric pressure is pumped to the flash vessel, whereas fluid at higher pressure flows to the flash vessel through pressure difference. This results in flash of the feedwater which increases fluid silica concentrations and increases pH slightly as additional acidic gases are removed. Reduced fluid temperatures due to this flash of the feedwater which increases fluid silica concentrations and increases pH slightly as additional acidic gases are removed. Reduced fluid temperatures due to this flash also increase the degree of supersaturation with respect to amorphous silica. The flashed steam is condensed under vacuum by cooling water in a separate condenser vessel. The liquid from both the condenser and flash vessels exits at the bottom of the vessels via open barometric legs.

The condenser effluent contains geothermal steam condensate and cooling water which are sent to waste.

Flash cooling relative to alternative methods results in:

i) rapid cooling, which reduces arsenic adsorption upon coagulation ii) increased supersaturation and yields upon precipitation

1.3 Precipitation

The feedwater from the flash cooling vessel can either enter a covered tank, by gravity feed, or be pumped directly to the conditioners. The primary purpose of the tank is to age fluid when precipitated silica of Type I is required. When the aging tank is employed, this also acts as a seal for acts as a seal for the barometric leg.

The tank is baffled to provide even aging of the fluid. Fluid residence time is adjustable from 0 to 2 hrs by use of the bypass line or adjustment of the level control system provided for the tank. The aging step can be by-passed if desired. Immediate or staged coagulation as discussed elsewhere herein can be used to produce silicas of Type II & III.

From the aging tank or bypass, feedwater is pumped through astatic mixer to the conditioning vessels.

Addition of primary coagulant and/or flocculent is possible from stock tanks shown in FIGS. 14. For example calcium chloride can be introduced by way of a dosing pump with coagulant addition upstream of a centrifugal pump to ensure that rapid mixing takes place. Mixing is made uniform through the static mixer. Rapid mixing is preferable to maintain consistent secondary particulate size and is assisted by way of partial recycle of the aged feedstock stream, the precipitated silica slurry stream and/or clarified underflow from the separation plant.

Conditioning vessels allow floc growth prior to their separation and allow floc conditioning with a mean fluid residence time range from 0 (bypass) to 10 mins.

1.4 Separation

The conditioned feedwater flows by gravity to the Dissolved Air Flotation (DAF) tank. Pressurized, air saturated recycled liquid is injected into the feedwater flow, just upstream of the DAF tank. Release of air from this water is achieved through pressure drop. The air is released as micron sized bubbles which attach to the silica flocs and effect flotation. The float is removed from the surface by a sweeper arm and pumped to the slurry storage tank.

The air - liquid saturation plant is sized for 50% recycle and it can use either recycled DAF tank effluent or in some cases non-separated feedwater. The maximum air - liquid saturation operation pressure is 10 bar (g) which corresponds to a maximum attainable air to solids ratio at full flow of approximately 0.08.

The effluent from the DAF tank (underflow) is sufficiently low in colloidal silica to be disposed of in a manner similar to that employed for other geothermal water. However in this instance the water has been rendered more benign by virtue of heat, gas an silica removal.

1.5 Product Storage

Product in this instance, is stored in a covered tank fitted with a submerged agitator. Slurry solids content should be maintained below 30 kg m$^{-3}$ in the case of Type I silica. Above this, viscosity rises exponentially and eventually the slurry reaches its gel point. Type I slurries exhibit thixotropic properties and can impart these to the medium to which they are to be applied. However for Types II & III silicas, this thixotropic property is far less evident and slurry solids content of 400 kg m$^{-3}$ can readily be achieved.

Alternatively, the slurry is drived and ground with the use of standard engineering equipment.

2.0 Main Process Equipment

2.1 Plant Fee System

Fluid is drained from the weirbox of DA 21/27 silencer into an adjacent pump pit. From the pump pit the fluid is pumped through an above ground steel pipe to the flash vessel or by-pass. The pump is a vertical centrifugal unit, which is installed in a pit at sufficient depth to provide the net positive suction head required to pump fluid at its vapor pressure.

Provision can also be made to supply the plant directly from the separated water outlet of the separators. This requires the design and installation of pipework suitable for pressurized elevated temperature service. No other revisions to plant design are necessary.

2.2 Flash Coller/Condenser

Pressure operating range—0.01–0.25 bar abs
Feedwater inlet temperature—100°
Feedwater outlet temperature—45° to 100° C.
Feedwater flowrate—10 kg s$^{-1}$ (max)

The flash vessel has a tangential feedwater inlet. The condenser is of the counter current tray type with the vapor inlet at the bottom of the condensing section.

Cooling water and condenses vapor from the flash cooler condenser drain from the condenser vessel through the barometric leg to a small seal tank. The water then overflows to drain.

Flashed geothermal fluid drains in a similar manner from the flash vessel to a seal tank, from which the fluid is pumped to the aging tank. The aging tank can also be bypassed by opening the bypass piping.

Both vessels are elevated and the liquid discharges from the bottom via open unvalved barometric legs which protect the vessels from flooding.

The vessel vacuums are maintained by using a vacuum pump.

2.3 Aging Tank

Volume—65 m3

The aging tank is baffled to ensure even aging time of up to 2 hours. Fluid level in the tank is controlled using an automatic level control system.

2.4 Conditioning Tanks

Volume—0.85 m$^3$
Vessel Flow Capacity—10 kg s$^{-1}$

Five conditioning vessels have been provided to allow variation of residence time. The inflow is by gravity into the top of the vessel and is baffled to minimize turbulence. The liquid flows vertically downwards to the conical bottom and discharges immediately into the DAF tank to avoid floc accumulation.

The liquid level is controlled by the liquid level in the DAF tank.

2.5 Dissolved air Flotation (DAF) Tank

Flow Capacity—10 kg s$^{-1}$
Product—<30 kg m$^{-3}$
Float Area—5 kg hr$^{-1}$m$^{-2}$
Volume—9.3 m$^3$
Recycle Pressure—<10 bar g The tank has inlet nozzles, a flow baffle, a mechanical float skimmer, an air saturator vessel, recycle pump, piping and a surfactant injection system.

The air saturator vessel and recycle pump are capable of providing a recycle rate of 50% full flow. At 7 bar (g) an air-solids ratio of at least 0.06 can be achieved. Either DAF tank effluent or in some cases conditioned feedwater is used for the air saturator feed.

The air space is maintained in the saturator and the liquid level control is via a level sensing device and a control loop to a by-pass valve around the recycle pump.

The DAF nozzles introduce recycled fluid directly behind the flow of fluid from the conditioning vessels. Inlet velocite is are low to ensure flocs are not damaged by excessive turbulence.

DAF vessel operation is optimized by adjustment of baffle plate angle, beach length, paddle speed, recycle rate and air saturation pressure to maximize product recovery.

2.6 Chemical Dosing

Chemical mixing and dosing equipment is provided to facilitate the preparation, storage and dosing of chemicals including calcium chloride and other primary coagulants, cationic flocculent, surfactants and pH correction agents (either NaOH or HCl). Chemicals can be either prepared from dry powder or bulk liquid deliveries can be made.

Dosing pumps are capable of accurate dosing rates from 0–100% capacity rate.

Pump capacities are as follows:
Coagulant—0.05 kg s$^{-1}$
Surfactant—0.05 kg s$^{-1}$
Flocculent—0.05 kg s$^{-1}$
pH correction—0.05 kg s$^{-1}$

3.0 Process Examples

The following examples illustrate the use of different process and plant conditions to produce several precipitated silica products from the combined water flow of production wells KA21 and KA27 situated within the Kwerau Georthermal Resource.

Equivalent products have been obtained from other geothermal sources e.g. Kawerau wells KA19, 28, and 35, Wirakei main drain and separated water (FP#2), Ohaaki BR20, Philippines Pal14D and W102. .

The process examples are based on atmospheric discharge from the separators (initially at a temperature of 172° C.) which has undergone two processes. Part of the total flow from the separators passes through a binary cycle turbine and is redischarged to the main silencer at 110° C. The remainder flows directly to the main silencer. A small increase in yield results for precipitation as result of bypassing the binary cycle turbine.

3.1 Example 1—Type I Silica (refere FIG. 14)

Separated water with a flow rate of 10 kg s$^{-1}$ and a silica concentration of 837 mg kg$^{-1}$, is flash cooled from 100° C. to 50° C. through a flash cooling vessel to produce a feedstock water flow of 9.12 kg s$^{-1}$ having a pH of 9.0 (50° C.) and a silica concentration of 918 mg kg$^{-1}$.

Water from the flash cooler is then aged for ~80 mins., prior to calcium chloride addition. A final Ca$^{2+}$ concentration of ~200 mg kg$^{-1}$ is attained. Solution pH decreases 0.30–0.50 units to ~8.6 after Ca$^{2+}$ addition, consistent with limited deprotonation of the silanol surface. Floc formation proceeds rapidly and ~3 mins residence time is applied through the conditional vessels prior to separation.

Fluid flows through the ageing tank, with ageing time controlled by adjustment of tank level using automatic level control on the outlet piping.

Calcium chloride coagulant and a flocculant are introduced at a controlled rate at the exit to the aging tanks. The fluid is mixed in an in-line static mixer before being laid in the conditional tanks to allow floc formation. Up to 200 mg kg$^{-1}$ silica is left in solution after formation of the silica floc.

On introduction to the DAF tank, a minimum yield of 90% results in recovery of ~20 kg hr$^{-1}$ (anhydrous SiO2 basis) silica slurry at concentrations varying from 15 kg m$^{-3}$ to 30 kg m$^{-3}$, depending on DAF operating parameters. Product is pumped to storage and agitated slowly to maintain consistent concentrations in the storage vessel.

DAF recycle fluid is drawn from the DAF tank underflow, and pumped to the desired recycle pressure, and air is then introduced to dissolve in the recycle water.

Excess effluent flows from the DAF underflow to drain at a rate of 8.73 kg s$^{-1}$, having in solution up to ~200 mg kg$^{-1}$ silica, 200 mg kg$^{-1}$ Ca$^{2+}$ and traces of flocculant (this is usually specifically absorbed). Up to 1.71 kg hr$^{-1}$ of silica floc is also lost with the DAF effluent.

Discussion of the physical and chemical characteristics of this precipitate are contained in laboratory example 1, second 4.1. The properties of precipitate produced at 65° C. and 80° C. are also described in the same section. This discussion also includes descriptions of precipitates, where other process variables are modified.

3.2 Example 2—Type II Silica

Separated water at ~100° C. with a flow rate of 10 kg s$^{-1}$ an initial pH ~9.0 and a silica concentration of 837 mg kg$^{-1}$ is pre-treated with calcium chloride such that the mixed solution has a Ca$^{2+}$ concentration up to 200 mg kg$^{-1}$. The exact concentration is varied to achieve complete downstream precipitation with or without assistance of cationic flocculant in an amount of up to 5 mg kg$^{-1}$.

Admixture of primary coagulant in this case is achieved by dosing the separated water stream prior to atmospheric or sub-atmosphereic flash. For atmospheric, silcencer feed, water is taken from the silencer outlet to teh weirbox and the point of dosage is at the suction side of the hot feed pump.

If the separated feedwater source is from the primary separators at the saturation temperature, typically 172° C., then dosage is at the flash cooler, just downstream of the pressure control valve. Flash to 100° C. occurs through the flash cooler in this case.

The silencer feedwater is pumped through the flash cooler but no condensing takes place giving a feed to the process of 10 kg s$^{-1}$ at a temperature of 95° C. to 98° C. and a silica concentration of 837 mg kg$^{-1}$.

After floc development in the conditioning vessels the fluid is introduced to the DAF clarification stage where a minimum silica yield of 90% results in the recovery of 10.8 kg hr$^{-1}$ (dry weight basis). Effluent from the clarifer discharges to drain at a rate of 9.6 kg s$^{-1}$ having dissolved solids concentrations up to ~500 mg kg$^{-1}$ silica, 200 mg kg$^{-1}$ Ca$^{2+}$ and 5 mg kg$^{-1}$ flocculant. Suspended solids in the effluent have a concentration of ~35 mg kg$^{-1}$.

Yield may be further enhanced by precipitated slurry recycle at the point of coagulant addition. Yield from a production run is maximized by application of shear to the recycle slurry with an in-line shear mixer. This provides a particle size distribution which maximises the silica particle population introduced to enhance heterogeneous nucleation.

The physical and chemical properties of precipitates from these treatments are discussed in section 4.2.

3.3 Example 3—Type III Silica

Separated water at a rate of 10 kg s$^{-1}$ and a silica concentration of 837 mg kg$^{-1}$ is flash cooled from 100° C. to 80° C. through a flash cooling device to produce feedstock water with an initial pH of 8.78 (80° C.), at a flow rate of 9.64 kg s-1 and a silica concentration of 864 mg kg$^{-1}$.

The feedwater is pumped directly to the conditioners having been treated with calcium chloride such that final solution concentration is up to 200 mg kg$^{-1}$ with respect to Ca$^{2+}$. The exact concentration is adjusted to achieve progressive precipitation upon subsequent ageing and cooling. Fluid residence time in the system is short such that coagulant is present prior to and during the active polymerization phase.

Primary coagulant concentrations can be lowered if lower yields are permissable but are adjusted together with cationic flocculant to achieve complete precipitation; typically, flocculant concentrations can be maintained below 5 mg kg$^{-1}$. Residence time in the conditioning vessels is set such that effective precipitation is achieved and the flocced fluid is then introduced to the DAF unit.

Yield may be enhanced with the use of slurry recycle as described in example 2 above.

On introduction to the DAF tank, a minimum yield of 90% is achieved, which results in the recovery of silica at a rate of 18.3 kg hr$^{-1}$ at a consistency of 15 kg/m3 to 30 kg/m3 (dry wight basis). Higher consistencies can be obtained for both Type II & III silicas, e.g. ~40 wt %.

Effluent from the DAF unit discharges to drain at a rate of 9.25 kg s$^{-1}$, having dissolved solids concentrations of up to ~400 mg kg$^{-1}$ silica, 200 mg kg$^{-1}$ Ca$^{2+}$ and 5 mg kg$^{-1}$ cationic fluocculant. Silica floc at a concentration up to 70 mg kg$^{-1}$ is also present in the DAF effluent stream.

Dosing of the fluid with surfactant or for pH adjustment is not normally required.

Chemical and physical characteristics of this precipitated silica are discussed in section 4.3, I.

4.0 Physical and Chemical Characterization of Precipitates Laboratory Examples; Including Products of Process Examples Physical and chemical characteristics are discussed for several laboratory examples, to illustrate:

i) the properties of precipitated silicas produced under process conditions outlined in process examples hereof ii) the influence of process variables on chemical composition and also physical and structural characteristics

4.1 Type I Silica

The following examples illustrate the structural and compositional differences which are obtained for precipitated silicas, where ageing is applied prior to addition of coagulant which exceed the critical coagulant concentration.

1. Ageing After Rapid Cooling

Separated geothermal water, with a silica concentration of 850 mg kg$^{-1}$, is rapidly cooled under laboratory conditions by a flash cooler in conjunction with a heat exchanger to 45°-55° C. As discussed elsewhere, other cooling devices can be used on a larger scale. Solution pH is maintained within the range 7-9. This water is then allowed to age from ~2 to 24 hrs., at which time coagulation is induced by $CaCl_2.2H_2O$ addition such that the solution concentration is initially 200 mg kg$^{-1}$ in $Ca^{2+}$ as described for the other examples discussed here.

Characterization

A milky way precipitate occurs immediately upon addition of coagulant. The time for visible floc formation to become apparent is several minutes, e.g. 2-4.

Figure 2:
FIG. 2 and 3 are photomicrographs of Type I precipitated silica possessing tertiary aggregate and secondary particulate structure.

FIGS. 1 & 2 show TEM micrographs for precipitated silica produced from fluid flash cooled to 50° C. using 200 mg kg$^{-1}$ $Ca^{2+}$. The secondary particulate size averages ~12 nm. Tertiary aggregate structure is well developed and clearly illustrates the existence of secondary particulate and bridging silica described earlier for Type I silica.

The untreated slurry floc size averages 90 μm and when dried and milled this particle size decreases to an average of ~7-8 μm.

The dry powder has a high oil absorption capacity in the range 150-200 cm$^3$ 100 g$^{-1}$.

The anhydrous chemical compositions of several precipitates produced at 50° C. and higher temperatures are shown in table 1.

The most striking feature of the chemical composition of this product is the very low arsenic [As] concentrations achieved.

The water component comprises:

i) a—50° C. treatment, 4-7 wt % physisorbed, 10 wt % chemisorbed ii) b—65° C. treatment, 3-4 wt % physisorbed, 11-12 wt % chemisorbed iii) c—80° C. treatment, 2 wt % physisorbed, 17 wt % k chemisorbed

TABLE 1

| | | CHEMICAL COMPOSITION | | | |
|---|---|---|---|---|---|
| SiO$_2$ wt % | CaO wt % | Fe$_2$O$_3$ wt % | Al$_2$O$_3$ wt % | S wt % | As mg kg$^{-1}$ |
| 90.50 a | 7.56 | 0.02 | 0.28 | 0.018 | 12.6 |
| 95.97 a | 3.56 | 0.03 | 0.43 | 0.015 | 8.6 |
| 81.36 b | 12.68 | — | — | 0.025 | 27.5 |
| 74.81 c | 22.64 | 0.01 | 0.33 | 0.047 | 56.9 | a-50° C. treatment
b-65° C. treatment SEE TEXT ABOVE
c-80° C. treatment

Measured BET (N$_2$) surface areas for the 50°, 65° and 80° C. treatments listed in table 1 above were 168, 179 and 118 m$^2$g$^{-1}$ respectively.

2. Long Ageing at Low Temperature Precipitation

Separated geothermal water with a silica concentration of ~850 mg kg$^{-1}$ is cooled from 100° C. to 35° C. over 18 hrs. This cooling can be achieved by allowing the geothermal fluid to stand and simulates what can be expected from natural pond cooling. pH remains unmodified if natural solution pH is maintained between pH 7-9. Coagulation is initiated by addition of a concentrated $CaCl_2.2H_2O$ stock solution, at ~100,000 mg kg$^{-1}$ to achieve a final concentration of 300-400 mg kg$^{-1}$ $Ca^{2+}$. Introduction of the coagulant is performed according to conditions outlined in the treatment above.

Characterization

A milky white precipitate occurs immediately upon addition of the coagulant. However floc formation is not visible for several minutes, e.g. 2-5. Initial floc size is significantly smaller than under hotter conditions and only slowly increases. The final floc size remains smaller than than that formed under hotter conditions; up to the time at which natural gravitational settling would be complete.

At a coagulant concentration of 300-400 mg kg$^{-1}$ $Ca^{2+}$, primary, secondary and tertiary particle size and structure are similar to that described in the treatment under hotter conditions.

Yield can be enhanced with an increase in the $Ca^{2+}$ concentration used, or alternatively the coagulant, flocculant combination can be employed.

The secondary particulate size for a 300 mg kg$^{-1}$ $Ca^{2+}$ treatment was ~15 nm. The use of 600 mg kg$^{-1}$ $Ca^{2+}$ as coagulant at these slightly lower temperatures, decreases the mean secondary particle size to ~12 nm. This contributes to an increased surface area from 120 m$^2$g$^{-1}$ to ~150 m$^2$g$^{-1}$.

The overall structural characteristics are similar to that described for the 200 mg kg$^{-1}$ $Ca^{2+}$ treatment, under hotter conditions (FIG. 2).

The anhydrous chemical composition is shown in table 2.

This product contains significantly less calcium and more silica than that coagulated under hotter conditions, described in treatment 1, above. Arsenic adsorption is also low under these conditions. The extent of adsorption is largely governed by the temperature at which ageing occurs, given comparable feedstock solution pH. As for all unwashed products described here, contamination by colourants such as iron is negligible.

TABLE 2

| | | CHEMICAL COMPOSITION | | | |
|---|---|---|---|---|---|
| SiO$_2$ wt % | CaO wt % | Fe$_2$O$_3$ wt % | Al$_2$O$_3$ wt % | S wt % | As mg kg$^{-1}$ |
| 96.85 | 2.59 | 0.028 | 0.519 | 0.019 | 21.2 |

The water component comprises:

i) 4 wt % physi-sorbed ii) 7 wt % chemi-sorbed

Yield under these conditions has been determined as 450 mg kg$^{-1}$ on a pure, anhydrous SiO$_2$ basis.

Acid washing of this product decreased the CaO component to 0.31 wt %, while increasing the silica content to 99.19 wt %. However, upon acid washing a significant amount of arsenic sulphide has been observed to form and can reduce product whiteness.

3. Short Ageing at High Temperature Precipitation

Separated geothermal water with a silica concentration of ~850 mg kg$^{-1}$, is cooled from 100° C. to 80° C. after 20 minutes ageing. Sufficient sample volume is collected such that fluid temperature upon standing reaches 80° C. Induced coagulation of the silica sol formed is effected by addition of a concentrated $CaCl_2.H_2O$ stock solution, at ~100,000 mg kg$^{-1}$ to achieve a final solution concentration of 200 mg kg$^{-1}$ $Ca^{2+}$ >

Rapid and thorough mixing of the $CaCl_2$ solution with the geothermal fluid is necessary to avoid localized high concentrations of coagulant, which affects secondary particle size.

Characterization

A milky white precipitate forms immediately, upon $Ca^{2+}$ addition and within a minute, floc formation is clearly visible.

The stable untreated floc (tertiary aggregate) size expressed in terms of volume distribution is shown in FIG. 5. The slurry floc size may be influenced by surfactant addition, conditioning time and shear to meet a particle size volume distribution with mean at $\sim 8$ μm, with $\leq 90\%$ of the particle population $<20$ μm; this specification is expressed in terms of the dispersed, dry powder.

Figure 3:

A Transmission Electron Micrograph shown in FIG. 3 indicates that the mean secondary particle size can be as high as $\sim 12$ nm where this is distinguishable. The primary or ultimate particle size illustrated by the textural grain apparent in FIG. 1, is $\sim 1.5$ nm (15 Å). The overall structural make-up comprises spheroidal secondary particles linked via a complex mass of primary particles, which constitute the bridging silica which contributes to an intricate three dimensional silica aggregate. The bridging silica generally lacks definitive geometry (FIGS. 1-3), apart from being more elongated than spheroidal particles and generally not exceeding the cross-sectional diameter of these.

The anhydrous chemical compositions of several precipitates produced using these precipitation conditions are illustrated by the ranges report in table 3.

TABLE 3

| | CHEMICAL COMPOSITION | | | | | |
|---|---|---|---|---|---|---|
| | $SiO_2$ wt % | CaO wt % | $Fe_2O_3$ wt % | $Al_2O_3$ wt % | S wt % | As mg kg$^{-1}$ |
| 1. | 74.14 | 21.88 | 0.030 | 0.360 | 0.070 | 91.5 |
| 2. | 89.94 | 9.20 | 0.025 | 0.778 | 0.055 | 74.0 |

Water composition was determined as follows:
i) physisorbed; 2-5 wt % for 1 & 2 respectively
ii) chemisorbed; 13-17 wt % for 1 & 2 respectively The determination of yield for several precipitates produced under these conditions shows that $\sim 475$ mg kg$^{-1}$ SiO2 is extractable; this assessment is based on pure anhydrous silica.

Decantation acid washing of the precipitated silica (table 3, No1) using 0.1N HCl results in a product, with the composition given in table 4. The significant decrease in calcium concentration represented as CaO, indicates the surface adsorbed nature of the coagulant and dissolution of traces of calcium carbonate.

TABLE 4

| | CHEMICAL COMPOSITION | | | | | |
|---|---|---|---|---|---|---|
| | $SiO_4$ wt % | CaO wt % | $Fe_2O_3$ wt % | $Al_2O_3$ wt % | S wt % | As mg kg$^{-1}$ |
| 1. | 96.91 | 2.47 | 0.017 | 0.581 | 0.019 | 33.1 |

The unwashed precipitated silica has a surface area determined by $N_2$ adsorption (BET), of 140 m$^2$g$^{-1}$. Should an increase in surface area be desired, a decantation acid wash can be performed. For example, pH adjustment of the brine in contact with slurry to $\sim$ increases the surface area t 260 m$^2$g$^{-1}$.

The unwashed and acid washed products have high oil absorptive characteristics. The unwashed precipitated silica has an oil absorption value of $\sim 110$ to 200 cm$^3$ 100 g$^{-1}$. The acid washed product slightly exceeds this range with oil absorption values in the range; 130 to 230 cm$^3$ 100 g$^{-1}$.

4.2 Type II Silica

Precipitation

Separated geothermal water at 100° C. with a silica concentration of $\sim 850$ mg kg$^{-1}$ and an initial pH of 8.90, is pre-treated with a known amount of 100,000 mg kg$^{-1}$ $CaCl_2$ stock solution, to achieve a final solution concentration of $\sim 200$ mg kg$^{-1}$. Solution pH decreases $\sim 0.3$ units.

On a laboratory scale continuous and thorough mixing of the $CaCl_2$ coagulant was achieved by timed, drip feed addition at the mini-silencer[4] water outlet.

[4]—mini-silencer; a small device used to atmospherically separate a pressurized two phase steam and water mixture.

Solution temperature decreased to 70° at the time of slurry separation.

Characterization

The solution turns milky white initially and over several minutes the precipitate is established.

Gentle continuous stirring is employed to allow contact of developed floc with finer colloidal silica until precipitation is essentially complete; up to 10 mins.

FIGS. 4 & 5 illustrate the structural characteristics of this silica which has been fully described elsewhere herein.

The anhydrous chemical composition is shown in table 5:

TABLE 5

| CHEMICAL COMPOSITION | | | | | |
|---|---|---|---|---|---|
| $SiO_2$ wt % | CaO wt % | $Fe_2O_3$ wt % | $Al_2O_3$ wt % | S wt % | As mg kg$^{-1}$ |
| 80.9 | 15.6 | 0.42 | 1.19 | 0.14 | 62.9 |

Water composition was determined as follows:
i) physisorbed 1.7 wt %
ii) chemisorbed 14.6 wt %

Yield, without slurry recycle, of modified particle size is 350 mg kg$^{-1}$ (pure, anhydrous basis), which is significantly lower than that obtained for Type I silica.

Oil absorption capacities of the silica are significantly below that for Type I silicas, at 100 cm$^3$ 100 g$^{-1}$.

Slurry consistencies can reach $\sim 40$ wt % upon settling, in sharp contrast to Type I silica. The Type II silica has very little tendency to gel i.e. it is essentially non-thixotropic.

4.3 Type III Silica

Precipitation

Separated geothermal water at 100° C. and silica concentration $\sim 850$ mg kg$^{-1}$ is pre-treated with $CaCl_2$ solution such that the final solution $Ca^{2+}$ concentration is 100 mg kg$^{-1}$ during the polymerization phase.

The sol is then allowed to age for 20 mins. with intermittent stirring.

Characterization

Precipitation is progressive. First the solution turns milky and becomes more turbid with time. Then, floc formation proceeds, but precipitation is not complete after ageing.

Complete precipitation is effected with the addition of 2-3 mg kg$^{-1}$ charge density cationic flocculant.

Figure 6:
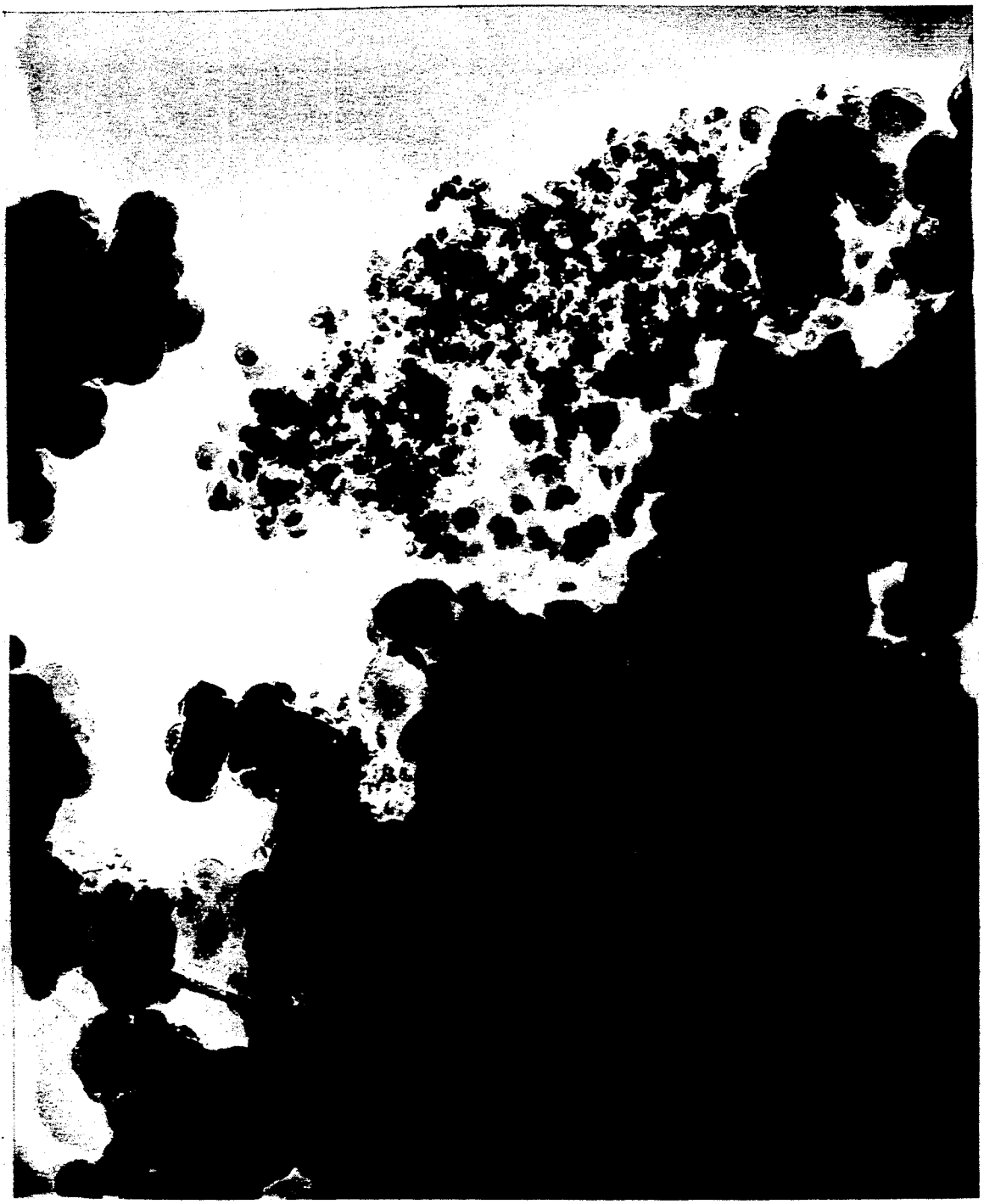
FIGS. 6 and 7 are photomicrographs of Type III precipitated silica.
Figure 7:

FIGS. 6 & 7 illustrate the diversity of structure obtained with this method of preparation.

Up to 450 mg kg$^{-1}$ SiO$_2$ (pure, anhydrous basis) is extractable.

The anhydrous chemical composition is shown in Table 6.

TABLE 6

| CHEMICAL COMPOSITION | | | | | |
|---|---|---|---|---|---|
| SiO$_2$ wt % | CaO wt % | Fe$_2$O$_3$ wt % | Al$_2$O$_2$ wt % | S wt % | As mg kg$^{-1}$ |
| 82.3 | 15.6 | 0.02 | 0.40 | 0.02 | 16.7 |

4.4 OTHER COAGULANTS

Chemical compositions for products precipitated with the use of Al$^{3+}$ and Mg$^{2+}$ salts are provided in table 7. These were precipitated under conditions which have been described for Type I silica. Precipitates have also been prepared according to procedures for Type II and III silicas using the above coagulants and have some similar characteristics to those reported for Ca$^{2+}$ treatments.

If aluminum ions are present in, or introduced to, the geothermal water, then they may substitute for silicon in the silica unit and hence be incorporated in the overall structure. Substitution is generally minor at lower coagulation temperatures but can be significant at higher temperatures.

As discussed elsewhere herein, arsenic adsorption is favoured with longer ageing at higher temperatures and also at lower pH during the coagulation step. Final pH after addition of Al$^{3+}$ to a composition of 40 mg kg$^{-1}$ was ~6.3.

TABLE 7

| CHEMICAL COMPOSITION | | | | | |
|---|---|---|---|---|---|
| SiO2 wt % | CaO wt % | Fe2O3 wt % | Al2O3 wt % | MgO wt % | As mg kg$^{-1}$ |
| 90.8-1a | 0.13 | 0.01 | 0.34 | 6.86 | 4.44 |
| 92.8-1b | 5.23 | 0.01 | 0.32 | 0.12 | 26.6 |
| 79.5-2a | 0.51 | 0.02 | 16.1 | 0.00 | 222 |
| 92.2-2b | 5.35 | 0.01 | 0.33 | 0.13 | 126 |

1a—200 mg kg$^{-1}$ Mg$^{2+}$ treatment/aged 2 hrs/slow cooling
1b—200 mg kg$^{-1}$ Mg$^{2+}$ treatment/rapid cool/aged
2a—40 mg kg$^{-1}$ Al$^{3+}$ treatment; as for 1a
2b—40 mg kg$^{-1}$ Al$^{3+}$ treatment; as for 2a It is significant that the magnesium treatments produced precipitated silica with high measured surface area; for sample 1a and 1b in table 7, these were 274 and 302 m$^2$g$^{-1}$ respectively.

4.5 Chemical Composition; Kawerau Production Wells

Table 8 shows the chemical composition of atmospherically separated water from several Kawerau production wells. Examination of arsenic concentrations in water versus that which may be surface adsorbed on to precipitated silica demonstrates the preferential enrichment when can occur for the solid phase, if precipitation conditions are not optimized.

What is claimed is:

1. A method of obtaining precipitated amorphous silica comprising siliceous material having a tertiary aggregate structure which is selected from the group consisting of Type-I, Type-II and Type-III amorphous silica, which method comprises:

providing a source fluid containing siliceous materials and an amount of a precipitation agent for said siliceous materials, selected from the group consisting of at least one cation, at least one cationic polymer, at least one cationic flocculent, and at least one non-ionic flocculent, which is insufficient to cause substantial quantities of said siliceous materials to come out of solution in said source fluid;

maintaining the pH of said fluid at up to about 9.5 during the following steps;

forming a silica sol, by causing said source fluid to become supersaturated with respect to amorphous silica and initiating polymerization of said siliceous materials therein into polymeric material comprising primary particles of polymeric amorphous silica, without causing substantial quantities of said siliceous materials to be precipitated;

aging said silica sol by holding such for a time sufficient to continue the polymerization of said siliceous materials in said sol into said polymeric material, without causing substantial quantities of said polymeric material to be precipitated;

adding to said silica sol a sufficient quantity of at least one of said precipitation agents to provide a sufficient proportion thereof, in relation to said polymeric material, to convert said polymeric material into a silica particle having a tertiary aggregate structure of said Type-I, Type-II or Type-III, and to cause rapid precipitation thereof from said silica sol; and harvesting precipitated amorphous silica.

2. A method as claimed in claim 1 wherein said siliceous material is silicic acid.

3. A method of claim 2 where in said source fluid has a silicic acid concentration of from 400 to 1400 mg kg$^{-1}$, expressed as silica.

4. A method of claim 1 wherein said source fluid is a geothermal fluid.

5. A method as claimed in claim 4 wherein said source fluid includes arsenic containing materials and said method includes the further step of reducing the temperature of said source fluid prior to said ageing, thereby minimizing the adsorption of arsenic on said precipitated silica.

6. A method as claimed in claim 5 wherein said source fluid is rapidly cooled from about 100° C. to about 30° C. just prior to said ageing step.

7. A method as claimed in claim 4 wherein process is performed at a pH of from 5 to 9.5.

8. A method as claimed in claim 7 wherein process is performed at a pH of from 7 to 9.5.

9. A method as claimed in claim 4 wherein said amorphous silica at a pH of from 7 to 9.5 is precipitated by adding at least one of a cation and a cationic polymer to said sol.

10. A method as claimed in claim 9 wherein said cation comprises a source of Ca$^{2+}$ added to said sol.

11. A method as claimed in claim 4 wherein the pH of said sol is higher than neutral and effecting said precipitation by adding a cationic flocculent to said sol in an amount sufficient to effect said precipitation.

12. A method as claimed in claim 4 wherein said harvesting is performed in such a way as to recover an aqueous slurry of the amorphous silica as a product.

13. A method as claimed in claim 4 wherein said harvesting is performed to produce a substantially dry amorphous silica.

14. A method as claimed in claim 1 wherein the amorphous silica product is of Type II or Type III and the source fluid has been artificially generated.

15. A method as claimed in claim 14 wherein said fluid includes arsenic containing materials and the temperature of said source fluid is reduced prior to any substantial ageing, thereby minimizing adsorption of arsenic on the precipitated silica.

16. A method as claimed in claim 15 including the further step of rapidly cooling said source fluid from about 100° C. to about 75° C. just prior to said ageing step, and recovering Type II amorphous silica.

17. A method as claimed in claim 1 wherein said cation comprises a source of $Ca^{2+}$.

18. A method as claimed in claim 1 wherein said precipitated amorphous silica comprises silica which has a Type II structure.

19. A method as claimed in claim 1 wherein said precipitated amorphous silica comprises silica which has a Type III structure.

20. A method as claimed in claim 4 wherein said geothermal fluid has a silicic acid concentration outside of the range of 400 to 1400 mg/kg, expressed as silica, wherein the onset and rate of polymerization during said ageing step is controlled by applying to said fluid at least one of the following steps: diluting said geothermal fluid, adjusting the pH of said geothermal fluid, and adjusting the temperature of said geothermal fluid.

21. A method as claimed in claim 4 wherein the pH of said sol is up to neutral and wherein said precipitation is effected by the step of adding a non-ionic flocculent to said sol in an amount sufficient to effect said precipitation.

22. A method as claimed in claim 4 including the further step of cleaning the harvested product.

23. A method as claimed in claim 22 wherein said cleaning is accomplished by washing.

24. A method as claimed in claim 13 wherein said product is a cake.

25. A method as claimed in claim 13 wherein said product is a powder.

26. A method as claimed in claim 14 wherein said geothermal fluid has a silicic acid concentration outside of the range of 400 to 1400 mg/kg, expressed as silica, and wherein the onset and rate of polymerization during said ageing step is controlled by applying to said fluid at least one of the following steps: diluting said geothermal fluid, adjusting the Ph of said geothermal fluid, and adjusting the temperature of said geothermal fluid.

27. A method as claimed in claim 15 further including the step of rapidly cooling said source fluid from about 100 to below about 75° C. just prior to said ageing step, and recovering Type III amorphous silica.

28. A method as claimed in claim 14 wherein the Ph of said sol is up to neutral and including the step of adding a non-ionic flocculent in an amount sufficient to precipitate said amorphous silica.

29. A method as claimed in claim 14 including the further step of cleaning said product.

30. A method as claimed in claim 29 wherein said cleaning is by washing.

31. A method as claimed in claim 1 wherein said product is a powder.

32. A method as claimed in claim 1 wherein said product is a cake.

33. A method of obtaining precipitated amorphous silica comprising siliceous material having a tertiary aggregate structure of Type-I and having a BET surface area of at least 4 $m^2$/gm, which method comprises:

providing an aqueous source fluid containing about 400 to 1400 mg of dissolved siliceous materials per kilogram of fluid and an amount of a precipitation agent for said siliceous materials, selected from the group consisting of at least one cation, at least one cationic polymer, at least one cationic flocculent, and at least one non-ionic flocculent, which is insufficient to cause substantial quantities of said siliceous materials to come out of solution in said source fluid;

maintaining the pH of said fluid at about 5 to 9.5 during the following steps;

forming a silica sol, by causing said source fluid to become supersaturated with respect to amorphous silica and initiating polymerization of said siliceous materials therein into polymeric material comprising primary particles of polymeric amorphous silica, without causing substantial quantities of said siliceous materials to be precipitated;

rapidly cooling said silica sol to a lower temperature, which is at least about 30° C.;

aging said silica sol, without adding precipitation agent thereto in an amount sufficient to cause substantial precipitation of tertiary aggregate silica particles therefrom, by holding such for a time sufficient to continue the polymerization of said siliceous materials in said sol into polymeric material comprising primary amorphous silica particles which are capable of being converted, by adjusting the concentration of precipitation agent, into tertiary aggregate amorphous silica particles of Type-I structure;

adding to said silica sol a sufficient quantity of at least one of said precipitation agents, in a manner so as not to raise the pH of the system to over about 9.5, to provide a sufficient proportion thereof in relation to said polymeric material to convert said polymeric material into a silica particle having a tertiary aggregate structure of Type-I and to cause the rapid precipitation thereof; and harvesting precipitated amorphous silica tertiary aggregate particles of Type-I structure.

34. A method as claimed in claim 33 wherein said product is harvested as a slurry.

35. A method as claimed in claim 33 wherein said product is harvested as a cake.

36. A method as claimed in claim 33 wherein said product is harvested as a powder.

37. A method as claimed in claim 33 wherein said product is harvested as a gel.

38. A method of obtaining precipitated amorphous silica comprising siliceous material having a tertiary aggregate structure of Type-II which method comprises:

providing an aqueous source fluid containing about 400 to 1400 mg of dissolved siliceous materials per kilogram of fluid and an amount of a precipitation agent for said siliceous materials, selected from the group consisting of at least one cation, at least one cationic polymer, at least one cationic flocculent, and at least one non-ionic flocculent, which is insufficient to cause substantial quantities of said siliceous materials to come out of solution in said source fluid;

forming a silica sol, by causing said source fluid to become supersaturated with respect to amorphous silica and initiating polymerization of said siliceous materials therein into polymeric material comprising primary particles of polymeric amorphous silica, without causing substantial quantities of said siliceous materials to be precipitated;

adding to said sol, prior to there being any substantial decrease in molybdate active silica concentration therein, a sufficient quantity of at least one precipitation agent to cause the conversion of said polymeric amorphous silica into amorphous silica particles of tertiary aggregate structure of Type-II;

adjusting the pH of said fluid at about 5 to 9.5;

aging said silica sol and said precipitation agent at said pH and without adding further precipitation agent thereto in an amount sufficient to cause substantial precipitation of tertiary aggregate silica particles therefrom, by holding such for a time sufficient to continue the polymerization of said siliceous materials in said sol into polymeric material comprising primary amorphous silica particles which are capable of being converted, by adjusting the concentration of precipitation agent, into tertiary aggregate amorphous silica particles of Type-II structure;

then, upon the formation of a quantity of amorphous silica tertiary aggregate particles of structure Type-II sufficient to allow the precipitation thereof, adding to said system a sufficient quantity of at least one of said precipitation agents, in a manner so as not to raise the pH of the system to over about 9.5, to provide a sufficient proportion thereof in relation to said polymeric material to convert said polymeric material into a silica particle having a tertiary aggregate structure of Type-II and to cause the rapid precipitation thereof; and harvesting precipitated amorphous silica tertiary aggregate particles of Type-II structure.

39. A method as claimed in claim 38 wherein said product is harvested as a slurry.

40. A method as claimed in claim 38 wherein said product is harvested as a cake.

41. A method as claimed in claim 38 wherein said product is harvested as a powder.

42. A method as claimed in claim 38 wherein said product is harvested as a gel.

43. A method as claimed in claim 38 including the further step of cooling said supersaturated solution, to a lower temperature at which rapid precipitation can occur, prior to said ageing step.

44. A method as claimed in claim 38 wherein said source fluid is a geothermal fluid.

45. A method of obtaining precipitated amorphous silica comprising siliceous material having a tertiary aggregate structure of Type-III which method comprises:

providing an aqueous source fluid containing about 400 to 1400 mg of dissolved siliceous materials per kilogram of fluid and an amount of a precipitation agent for said siliceous materials, selected from the group consisting of at least one cation, at least one cationic polymer, at least one cationic flocculent, and at least one non-ionic flocculent, which is insufficient to cause substantial quantities of said siliceous materials to come out of solution in said source fluid;

forming a silica sol, by causing said source fluid to become supersaturated with respect to amorphous silica and initiating polymerization of said siliceous materials therein into polymeric material comprising primary particles of polymeric amorphous silica, without causing substantial quantities of said siliceous materials to be precipitated;

adding a precipitation agent to said sol, a sufficient quantity of at least one precipitation agent to cause the conversion of said polymeric amorphous silica into amorphous silica particles of tertiary aggregate structure of Type-III and to cause the precipitation thereof from said sol;

adjusting the pH of said fluid at about 5 to 9.5;

aging said silica sol and said precipitation agent at said pH and without adding further precipitation agent thereto by holding such for a time and under conditions sufficient to cause additional polymerization of dissolved siliceous materials in said sol into polymeric material comprising primary amorphous silica particles which are capable of being converted, by adjusting the concentration of precipitation agent, into tertiary aggregate amorphous silica particles of Type-III structure;

then, upon the formation of a quantity of amorphous silica tertiary aggregate particles of structure Type-III sufficient to allow the precipitation thereof, adding to said system further quantities of at least one of said precipitation agents, in a manner so as not to raise the pH of the system to over about 9.5, to provide a sufficient proportion thereof in relation to said polymeric material to convert more of said polymeric material into a silica particle having a tertiary aggregate structure of Type-III and to cause the rapid precipitation thereof; and harvesting precipitated amorphous silica tertiary aggregate particles of Type-III structure.

46. A method as claimed in claim 45 including the further step of cooling said supersaturated solution to a lower temperature at which precipitation of amorphous silica can occur.

47. A method as claimed in claim 45 wherein said product is harvested as a slurry.

48. A method as claimed in claim 45 wherein said product is harvested as a cake.

49. A method as claimed in claim 45 wherein said product is harvested as a powder.

50. A method as claimed in claim 45 wherein said product is harvested as a gel.

51. A process for treating a hot geothermal fluid containing siliceous materials comprising:

(a) extracting heat from said source geothermal fluid, sufficient to cause the remainder of the source fluid to become supersaturated with respect to amorphous silica, and to form a silica sol, but insufficient to cause the temperature of said fluid to become reduced to below ambient, in the presence of an amount of precipitating agent which is insufficient to cause precipitation of substantial quantities of siliceous materials from said source fluid, (b) adjusting and maintaining the pH of said fluid to up to about 9.5, (c) ageing said supersaturated solution, by holding such for a time sufficient to cause the polymerization of said amorphous silica and to increase the quantity of primary amorphous silica particles in the silica sol, (d) adding to said silica sol, a sufficient quantity of at least one precipitating agent selected from the group consisting of at least one cationic, at least one cationic polymer, at least one cationic flocculent, and at least one non-ionic flocculent to precipitate amorphous silica therefrom, and (e) separating the precipitated amorphous silica from the remainder of the source fluid, thereby providing a product comprising:
(i) amorphous silica having a structure which is selected from the group consisting of substantially tertiary aggregate, Type I, Type II, and Type III silica, and
(ii) a geothermal source fluid above ambient temperature containing a substantially reduced content of siliceous material.

52. The process as claimed in claim 51 wherein said heat is extracted in a power generation process.

53. The process as claimed in claim 51 wherein said heat is extracted by heat exchange to produce steam suitable for use in power generations.

54. The process claimed in claim 51 wherein said heat is extracted by flashing said geothermal to produce steam.

55. The method as claimed in claim 1 wherein said polymerization is carried out for a time sufficient to substantially reduce the concentration of molybdate active silica in said solution an amount such that said product comprises said tertiary aggregate form of amorphous silica.

56. A method of obtaining amorphous silica, comprising silica material having a structure which is at least one selected from the group consisting of tertiary aggregate Type I, Tertiary aggregate type II, and Tertiary aggregate type III silica, which method comprises:

providing a source fluid containing siliceous materials, at a temperature and a pH, and containing an amount of precipitating agent, in relation to the content of said siliceous materials, insufficient to cause the uncontrolled, spontaneous precipitation of said siliceous materials as silica or as a metal silicate;

maintaining the pH of said fluid at up to about 9.5;

causing said source fluid to become supersaturated with respect to amorphous silica without causing precipitation of said amorphous silica;

ageing said supersaturated solution, by holding it for a time sufficient to polymerize dissolved silica, to increase the quantity of primary amorphous silica particles therein and to form a silica sol;

then adding to said silica sol, at least one precipitation agent, selected from the group consisting of cations, cationic polymers, cationic flocculents, and non-ionic flocculents, in an amount and under conditions sufficient to cause the rapid precipitation of amorphous silica, comprising silica material which is characterized, by reference to high resolution microscopy, to be of tertiary aggregate structure of at least one of the type I, II or III structure; and harvesting a product comprising at least said precipitated silica material having said tertiary aggregate structure.

57. A method as claimed in claim 56 wherein said source fluid is derived from a geothermal source and contains arsenic moieties, which method further comprises, prior to said ageing step, rapidly cooling said source fluid from the temperature at which it is produced from said geothermal source to about 100° C. to 30° C., thereby reducing the amount of arsenic harvested with said precipitated amorphous silica from that amount which would have been harvested with the silica without such rapid cooling step.

58. A method as claimed in claim 56 or 57 wherein said precipitated silica material comprises material of type I structure.

59. A method as claimed in claim 56 or 57 wherein said precipitated silica material comprises material of a type II structure.

60. A method as claimed in claim 56 or 57 wherein said precipitated silica material comprises material of type III structure.

61. A method as claimed in claim 56 wherein said precipitation agent is selected from the group consisting of cations and cationic polymers.

62. A method as claimed in claim 56 including maintaining the pH of the said solution during said rapid precipitation step at about 7 to about 9.5 when said precipitation agent is cationic.

63. A method as claimed in claim 62 wherein said precipitation agent comprises calcium ions.

64. A method as claimed in claim 56 including maintaining the pH of said solution during said rapid precipitation step below about 7 when said precipitation agent is a non-ionic flocculent.

65. A method as claimed in claim 56 including harvesting said silica material as an aqueous slurry comprising an aqueous medium the water content of which is derived from said source fluid.

66. A method as claimed in claim 56 wherein the harvested product is in the form of a powder or cake.

67. A method as claimed in claim 56 wherein said source fluid does not have a geothermal origin, but has been artificially created.

68. A method as claimed in claim 56 wherein said source fluid contains about 400 to 1400 mg of silicic acid, expressed as silica, per kg of fluid.

69. A method as claimed in claim 33 including cooling said sol to 100° to 30° C.

* * * * *